United States Patent [19]

Suzuki

[11] Patent Number: 5,850,527
[45] Date of Patent: Dec. 15, 1998

[54] INFORMATION PROVIDING APPARATUS

[75] Inventor: Toshimitsu Suzuki, Kawasaki, Japan

[73] Assignee: Fujitsu Limited, Kawasaki, Japan

[21] Appl. No.: 949,687

[22] Filed: Oct. 14, 1997

Related U.S. Application Data

[63] Continuation of Ser. No. 389,162, Feb. 15, 1995, abandoned.

[30] Foreign Application Priority Data

Mar. 17, 1994 [JP] Japan .................................. 6-047492

[51] Int. Cl.$^6$ .................................................. H04N 1/413
[52] U.S. Cl. .............................. 395/200.77; 395/200.61; 348/394; 348/403
[58] Field of Search .................. 364/940.92, 940.61, 364/282.4, 284.4; 379/269, 219, 220, 225, 224; 358/425, 426; 455/4.1, 4.2, 5.1; 395/892, 200.77, 200.3, 200.57, 200.61, 200.68; 370/437, 464, 465, 468; 348/394, 403

[56] References Cited

U.S. PATENT DOCUMENTS 4,730,348  3/1988  MacCrisken ............................. 375/122
5,301,191  4/1994  Otani ........................................ 370/84
5,444,703  8/1995  Gagliardi et al. ...................... 370/60.1

FOREIGN PATENT DOCUMENTS 63-135083  6/1988  Japan .
2-240756  9/1990  Japan .
4-172829  6/1992  Japan .

Primary Examiner—Thomas Peeso
Attorney, Agent, or Firm—Staas & Halsey

[57] ABSTRACT

An information providing apparatus identifies a transmission enabled band of a transmission line and selects information conforming to the band, thereby effectively utilizing the transmission band of the transmission line. The apparatus determined a period which is to be required before demanded information is provided and notifies it to the user as a wait period, whereby the apparatus is made convenient for the user to operate. The apparatus is disconnected from the line during the wait period, thereby reducing a waste of a line charge.

19 Claims, 29 Drawing Sheets

FIG. 6

| COMPRESSION METHOD | COMPRESSING RATE | COLUMN OF NECESSARY BAND |
|---|---|---|
| MPEG-1 | 1/30 | 1500Kbps |
| Video1 | 1/10 | 2400Kbps |
| JPEG | VARIABLE | VARIABLE |
| ⋮ | ⋮ | ⋮ |
| Indeo | 1/15 | 1200Kbps |

FIG. 7

| USER TERMINAL DEVICE IDENTIFICATION SYMBOL | PROGRAM IDENTIFICATION SYMBOL | COMPRESSION METHOD | COMPRESSING RATE |
|---|---|---|---|
| I-1 | A | MPEG-1 | 1/30 |
| I-2 | B | Video1 | 1/10 |
| II-1 | C | Motion JPEG | 1/50 |
| II-2 | D | Indeo | 1/15 |
| ...... | ...... | ...... | ...... |
| X | — | — | — |

FIG. 8

| USER TRANSMISSION LINE IDENTIFICATION SYMBOL | OCCUPIED BAND |
|---|---|
| 001 | 9600 bps |
| 002 | 64Kbps |
| 003 | 10Mbps |
| ⋮ | ⋮ |
| 00j | 156Mbps |

FIG. 13

| USER IDENTIFICATION SYMBOL | COMPRESSING RATE | COMPRESSION SERVICE FEE S1 | BASIC FEE B1 | TOTAL E1=S1+B1 |
|---|---|---|---|---|
| I | — | 3 $ | 3 $ | 6 $ |
| II | 1/10 | 2 $ | 5 $ | 7 $ |
| . . . . | . . . . | . . . . | . . . . | . . . . |
| X | 1/50 | 1 $ | 1 $ | 2 $ |

FIG. 15

| PROGRAM IDENTIFICATION SYMBOL | UTILIZATION STATE | END TIME |
|---|---|---|
| A | OCCUPIED | 11 MIN |
| B | AVILABLE | — |
| . | . | . |
| . | . | . |
| . | . | . |
| . | . | . |
| N | OCCUPIED | 30 MIN |

FIG. 16

| USER IDENTIFICATION SYMBOL | PROGRAM IDENTIFICATION SYMBOL | COMPRESSION METHOD | COMPRESSING RATE | WAIT PERIOD |
|---|---|---|---|---|
| I | N | MPEG-1 | 1/30 | 30 MIN |
| II | A | Video1 | 1/10 | 11 MIN |
| ........ | ........ | ........ | ........ | |
| X | B | Motion JPEG | 1/50 | — |

FIG. 17

| USER IDENTIFICATION SYMBOL | WAIT PERIOD | SERVICE FEE S2 | BASIC FEE B2 | TOTAL E2=S2+B2 |
|---|---|---|---|---|
| I | 30 MIN | 0 $ | 3 $ | 3 $ |
| II | 11 MIN | 2 $ | 5 $ | 7 $ |
| . . . . | . . . . | . . . . | . . . . | . . . . |
| X | — | 3 $ | 1 $ | 4 $ |

INFORMATION PROVIDING APPARATUS

This application is a continuation of application Ser. No. 08/389,162, filed Feb. 15, 1995, now abandoned.

BACKGROUND OF THE INVENTION

1. Field of the Invention

The invention relates to an information providing apparatus which provides information in various forms such as image and voice in accordance with a demand of a terminal device.

2. Description of Related Art

FIG. 1 is a block diagram showing an on-demand type information providing apparatus $2d$ of the prior art and its periphery. In the figure, programs A, B through E indicate information to be provided which is previously stored as programs in media such as an optical video disk and a videotape. The programs are reproduced by respective reproduction units $3a$, $3b$ through $3e$ and then output to apparatus terminals of a connection unit 4, respectively. Each reproduction unit is realized by an optical video disk device, a videotape reproduction device and the like.

The user demands a desired program of the information providing apparatus $2d$ via one of terminal devices $1a$, $1b$ through $1e$, and then conducts a remote control on the reproduction unit which stores the demanded program, so as to view or listen to the program. The terminal devices $1a$, $1b$ through $1e$ are connected to terminal device terminals of the connection unit 4 via transmission lines $6a$, $6b$ through $6e$, respectively. A control unit 5 of the information providing apparatus $2d$ receives a notification of the program demand from the connection unit 4, and then controls the connection unit 4 so that the reproduction unit for reproducing the demanded program and the terminal device for the user from which the demand is issued are connected to each other. When the user conducts a remote control, the remote control is transferred from the connection unit 4 to the corresponding reproduction unit. The transmission lines $6a$, $6b$ through $6e$ allow required signals to be transmitted in a bidirectional manner between the information providing apparatus $2d$ and the terminal devices $1a$, $1b$ through $1e$.

The operation of the apparatus will be described. When a demand for viewing or listening to the program A is issued from the terminal device $1a$ to the information providing apparatus $2d$, the connection unit, 4 transfers the demand to the control unit 5. When the program A is not occupied, the control unit 5 then controls the connection unit 4 so that, the video terminal corresponding to the reproduction unit $3a$ for reproducing the program A is connected to the terminal device terminal corresponding to the terminal device $1a$, and then allows the reproduction unit $3a$ to output the program A. The reproduction unit $3a$ reproduces image data of the program A and outputs them as image signals, and the terminal device $1a$ displays the transmitted signals. The terminal device $1a$ can freely remotely control the reproduction unit $3a$. When the program A is occupied, the control unit 5 notifies the terminal device $1a$ that the program A is not, available.

Similarly, the terminal device $1c$ receives the service provision of the program E, and the terminal device $1e$ receives the service provision of the program B. Since the contents of the programs A, B through E are different from each other, the following problem is produced. When plural users issue demands for viewing or listening to the same program, the user who first issues the demand can receive the program, but the other users must wait for receiving the program. In this case, the waiting users cannot know the wait period. In a system wherein the fee for provision of information is proportional to the period, the wait period is also charged on although the user does not receive any service during the wait period.

FIG. 2 is a block diagram showing a near on-demand (exchange) type information providing apparatus $2e$ of the prior art and its periphery. In the figure, a reproduction unit $3a_1$ for reproducing a program A which continues for one hour reproduces the program A with sequentially using five read heads at intervals of 12 minutes, and then sends the reproduced data to apparatus terminals $4a_1$ to $4a_5$ of a connection unit 4. More specifically, when the reproduction unit $3a_1$ reproduces the program A, the reproduced images are initially supplied to the apparatus terminal $4a_1$ of the connection unit 4, and, after 12 minutes later, to the apparatus terminal $4a_2$. This is repeated, and, after 48 minutes later, the reproduced images are supplied to the apparatus terminal $4a_5$. In this way, the reproduction unit, $3a_1$ supplies the program A to the five apparatus terminals at intervals of 12 minutes, and notifies the output start times to a control unit 5. Similarly, a reproduction unit, $3b_1$ for reproducing a program B which continues for one hour reproduces the program B, and then sends the reproduced data to apparatus terminals $4b_1$, $4b_2$ through $4b_5$ at intervals of 12 minutes. Transmission lines $6a$, $6b$ through $6e$ are connected to terminal device terminals $4a$, $4b$ through $4e$ of the connection unit 4, respectively. The control unit 5 controls the connection operation of the connection unit 4 on the basis of the time when a program is demanded. The other configuration is the same as that of FIG. 1. The same components are designated by the same reference numerals, and their description is omitted.

The operation of the apparatus will be described.

When a demand for viewing or listening to the program A is issued from the terminal device $1a$ to the information providing apparatus $2e$, the control unit 5 operates as follows: When the program A is not occupied, the control unit 5 controls the connection unit 4 so that the terminals $4a_1$ and $4a$ are connected to each other, and allows the reproduction unit $3a_1$ to reproduce and output the program A. The terminal device $1a$ displays the transmitted image signals. When three terminal devices $1b$, $1c$ and $1d$ simultaneously issue demands for viewing or listening to the program A to the information providing apparatus $2e$ after 20 minutes later, the connection unit 4 transfers the demands to the control unit 5. The control unit 5 identifies that, after 4 minutes later, the program A is outputted from a video terminal $4a_3$ from the beginning, and controls the connection unit 4 so that the apparatus terminal $4a_3$ is connected to the terminal device terminals $4b$, $4c$ and $4d$. This allows the three terminal devices $1b$, $1c$ and $1d$ to provide the last 4-minute portion and in succession from the beginning of the program A.

As described above, the information providing apparatus $2e$ sends the same program at a given time interval. The user views or listens to the first provision starting after his demand. Plural users can simultaneously view or listen to the same provision. However, the user cannot know the period which is to be elapsed before the program starts from the beginning. When plural users commonly utilize the same reproduction unit, the remote control by the respective users is restricted.

FIG. 3 is a block diagram showing a near on-demand (distribution) type information providing apparatus $2f$ of the prior art and its periphery. In the figure, a reproduction unit $3a_1$ for reproducing a program A which continues for one hour reproduces a program A with sequentially using five read heads at intervals of 12 minutes, and then sends the reproduced data to five apparatus terminals of a connection unit 4. Similarly, a reproduction unit $3b_1$ for reproducing a program B which continues for one hour reproduces a program B, and then sends the reproduced data to five apparatus terminals at intervals of 12 minutes. The connection unit 4 comprises five terminal sets each of which consists of five terminal device terminals corresponding to one of terminal devices 1a, 1b through 1e. The sets of five terminals are connected to the terminal devices 1a 1b through 1e via transmission lines 6a, 6b through 6e, respectively.

A control unit 5 controls the connection unit 4 so that one set of five apparatus terminals corresponding to the reproduction unit for reproducing the demanded program are connected to one set of five terminal device terminals corresponding to the terminal device for the user who has issued the demand. The terminal device 1a selects an arbitrary one of the five transmission lines 6a away one set, demands the program, remotely controls the reproduction unit, and displays the provided program. The other configuration is the same as that of FIG. 1. The same components are designated by the same reference numerals, and their description is omitted.

The operation of the apparatus will be described. The user issues a demand for viewing or listening to the program A, to the information providing apparatus 2f via the terminal device 1a. The connection unit 4 transfers the demand to the control unit 5, which in turn controls the connection unit 4 so that one set of five apparatus terminals corresponding to the reproduction unit $3a_1$ are connected to one set of five terminal device terminals corresponding to the terminal device 1a. Therefore, the program A is sequentially sent out to one set of the five transmission lines 6a in which the start times are shifted in sequence by 12 minutes. The user operates a switch of the terminal device 1a to view or listen to one of the five provisions of the program A. When a demand for listening to or viewing the program A is issued from the terminal devices 1b and 1c to the information providing apparatus 2f after an elapse of a short period, the connection unit 4 transfers the demand to the control unit 5. The control unit 5 controls the connection unit 4 so that one set of five video terminals corresponding to the reproduction unit 3a are connected to two sets of terminal device terminals each of which consists of five terminal device terminals and which respectively correspond to the terminal devices 1b and 1c. Therefore, the program A which is the same as that transmitted via the transmission lines 6a is sent out to two sets of the five transmission lines 6b and 6c. The users operate switches of the terminal devices 1b and 1c to view or listen to one of the five provisions of the program A which have been started at a short time interval.

The user of the terminal device 1d views or listens to the program B. As described above, by operating a switch, the user can select one of several provisions of a program which have been started at short time intervals. However, the user is not always ensured to view or listen to a program from the beginning. Although five transmission lines of one set elongate between the information providing apparatus and each terminal device, the user can view or listen to only one program at a time. When plural users commonly utilize the same reproduction until, moreover, the operation of the reproduction unit is restricted.

FIG. 4 is a block diagram showing the outline of a pure on-demand type information providing apparatus 2g of the prior art. In the figure, terminal devices 1a, 1b through 1e demand information of the information providing apparatus 2g in accordance with an operation conducted by a user, and receives the information when the demanded information is provided. The information providing apparatus 2g comprises storage devices 3a, 3b, 3c and 3d which respectively store information to be provided to the user in the form of image data, voice data, character data, and numeric data, a control unit 5 which provides the data in the storage devices to the user, and a communication control unit 4f which controls the communication between the control unit 5 and the terminal devices. The control unit 5 is connected to the storage devices 3a, 3b, 3c and 3d, the communication control unit 4f, and another information providing apparatus 2h. Consequently, the control unit 5 can send required data to and receive data from the other information providing apparatus 2h. The communication control unit 4f transmits data to the terminal devices 1a, 1b through 1e via transmission lines 6a, 6b through 6e. The transmission through the transmission lines 6a, 6b through 6e is conducted at a bit rate which allows information such as images to be transmitted to the terminal devices.

When the communication between one of the terminal devices 1a, 1b through 1e and the information providing apparatus 2g is done in an interactive manner, it is possible to immediately obtain desired information. In other words, when the terminal device is connected to the information providing apparatus 2g via one of the transmission lines through which communication is conducted at a desired bit rate, the user can utilize the information stored in the information providing apparatus 2g as if the apparatus is a library of the user. The bit rate of each transmission line is previously determined in accordance with the kind of information which the user utilizes. Even when, for example, the user who utilizes only voice information demands for image information, he cannot use the image information without conducting data compression. Since such a user has no facility for data compression, he cannot get the demanded image information. When a terminal device of a lower data transmission speed and another terminal device of a higher data transmission speed receive the same data of a large amount, furthermore, the period required for receiving the data in the former is longer than that in the latter. In such a case, when the fee for utilizing the information service is proportional to the period, the former device expends a higher fee because it consumes a longer period for receiving the same service. Since a high speed transmission line requires a high charge even in the case of a short utilization period, the latter device requires a higher charge for utilization of a transmission line. Therefore, accounts of both devices are substantially equal to each other, resulting in that services which are not equivalent to each other require the same account.

As seen from the above, on-demand type information providing apparatuses in a broad sense, including those of the on-demand type, the near on-demand (exchange) type, the near on-demand (distribution) type, and the pure on-demand type have the following problems:

when a user must wait in a process of utilizing the information provision service, the user cannot know the wait period;

even when there is a wait for the service, the wait period is not reflected in the fee;

since there is no facility for data compression, a user cannot select the quality of information;

the data transmission is restricted by the band specification of the transmission lines which is established when the information providing apparatus is installed;

since there is no facility for data compression, a user cannot select the quality of information, and hence the fee is charged not in accordance with the quality of information; and the data transmission is restricted by the band specifications of the transmission lines which are established when the information providing apparatus is installed, so that the service is provided only for given networks.

Telephone lines which are currently used have a band of 3.4 kHz. It is expected that lines of a broader band are used in future. When image signals are to be transmitted through such broadband lines, a transmission speed of about 100 Mbps is required. If the image signals are transmitted while compressing information, however, the transmission speed is lowered. When image signals are compressed by a compression method of MPEG in which the compressing rate is 1/30 and then transmitted at a transmission speed of 1.5 Mbps, the image quality is deteriorated to a level which is one fourth of the original level. However, there is a case where such image signals can sufficiently be utilized as image information, and the transmission amount is low. Furthermore, there are various compression methods such as Motion JPEG. In this way, it is a problem to configure an information providing apparatus so that it can freely be selected whether data is to be compressed or not, that a compression method can he selected, that the apparatus can cope with a compression method which is widely utilized in personal computers, that the apparatus can meet a demand for compression raised by the user, and that the quality deterioration due to compression is adapted by adjusting an account.

SUMMARY OF THE INVENTION

The invention has been devised in order to solve the problems discussed above. It is an object of the invention to provide an information providing apparatus which, when plural terminal devices are connected to one transmission line, can identify the transmission enabled band of the transmission line and provide compressed or uncompressed information conforming to the band, thereby effectively utilizing the transmission band of the transmission line, and which, when information is provided via transmission lines having different transmission bands, can compress information to provide, in accordance with the transmission band, whereby the apparatus can cope with various kinds of transmission lines.

The information providing apparatus of the invention provides, via a transmission line to which plural terminal devices are connected in accordance with demands of the plural terminal devices. The information providing apparatus of the present invention comprises: a detecting unit detecting a band of the transmission line in which information can be transmitted; plural compressing means for compressing information to provide, at different, compressing rates; a selecting unit, among information which is compressed by the compressing unit and a information which is not compressed, selecting information which can be transmitted within the range of the band which is detected by the detecting unit; and a sending unit sending out the information which is selected by the selecting means, to the transmission line.

The information providing apparatus of the invention provides, via plural transmission lines to which plural terminal devices are connected and which have different transmission bands in accordance with demands of the plural terminal devices. The information providing apparatus of the present invention comprises: plural compressing units having different compressing rates respectively for compressing information to provide at a compressing rate, in accordance with the transmission bands of the transmission lines in which the information is to be transmitted; and a sending unit sending out information to provide selected among information which is compressed by the compressing and information which is not compressed, to the transmission line.

Therefore, information conforming to the transmission band of the transmission line is selected so that the transmission band is effectively utilized. Furthermore, information is compressed at a compressing rate which conforms to the transmission band, and hence the apparatus can cope with various kinds of transmission lines.

It is another object of the invention to provide an information providing apparatus which can determine the period which is to be required before the apparatus can provide demanded information, and which notifies to the user the period as the wait period.

The information providing apparatus of the invention further comprises: a determining unit determining a period which is to be required before demanded information is provided.

The information providing apparatus of the invention further comprises: a notifying unit notifying the period determined by the determining unit to the terminal device; and a registering unit registering the information to provide, and, when the notified period has passed, the sending unit sends out the information registered in the registering unit to the transmission line.

Since the period which is to be required before the demanded information is provided is notified and the information is provided after the period, the apparatus is more convenient for the user to operate.

It is a further object of the invention to provide an information providing apparatus in which a fee for providing compressed information or information requiring a wait period can be reduced, and which can be disconnected from a line during the wait period, thereby reducing the line charge.

The information providing apparatus of the invention further comprises: an account unit deciding a fee for providing the information, in accordance with the compressing units; and/or an account unit deciding a fee for providing the information, in accordance with the period determined by the determining unit. The apparatus further comprises: a disconnecting unit disconnecting the apparatus from the transmission line after the information to provide is registered in the registering unit via a line which requires a fee; and a connecting unit connecting the apparatus to the transmission line which has been disconnected from the apparatus after the period notified by the notifying unit.

Therefore, the line charge for the period during which the demanded information is not being provided can be reduced, and the provision fee can be decided in accordance with the quality and value of the provided information.

The above and further objects and features of the invention will more fully be apparent from the following detailed description with accompanying drawings.

BRIEF DESCRIPTION OF THE DRAWINGS

FIG. 6 shows an example of an information band management table which is stored in a memory of a control unit;

FIG. 7 shows an example of a service provision management table which is stored in the memory of the control unit;

FIG. 8 shows an example of a transmission band management table which is stored in the memory of the control unit;

FIG. 13 shows an example of a fee management table according to a compressing rate which is stored in a memory of a control unit;

FIG. 15 shows an example of a program utilization state management table which is stored in the memory of the control unit;

FIG. 16 shows an example of a service registration table which is stored in the memory of the control unit;

FIG. 17 shows an example of a fee management table according to a wait period of a user, the table being stored in the memory of the control unit;

DESCRIPTION OF THE PREFERRED EMBODIMENTS

Hereinafter, the invention will be described in detail with reference to the drawings showing its embodiments.

Figure 1:
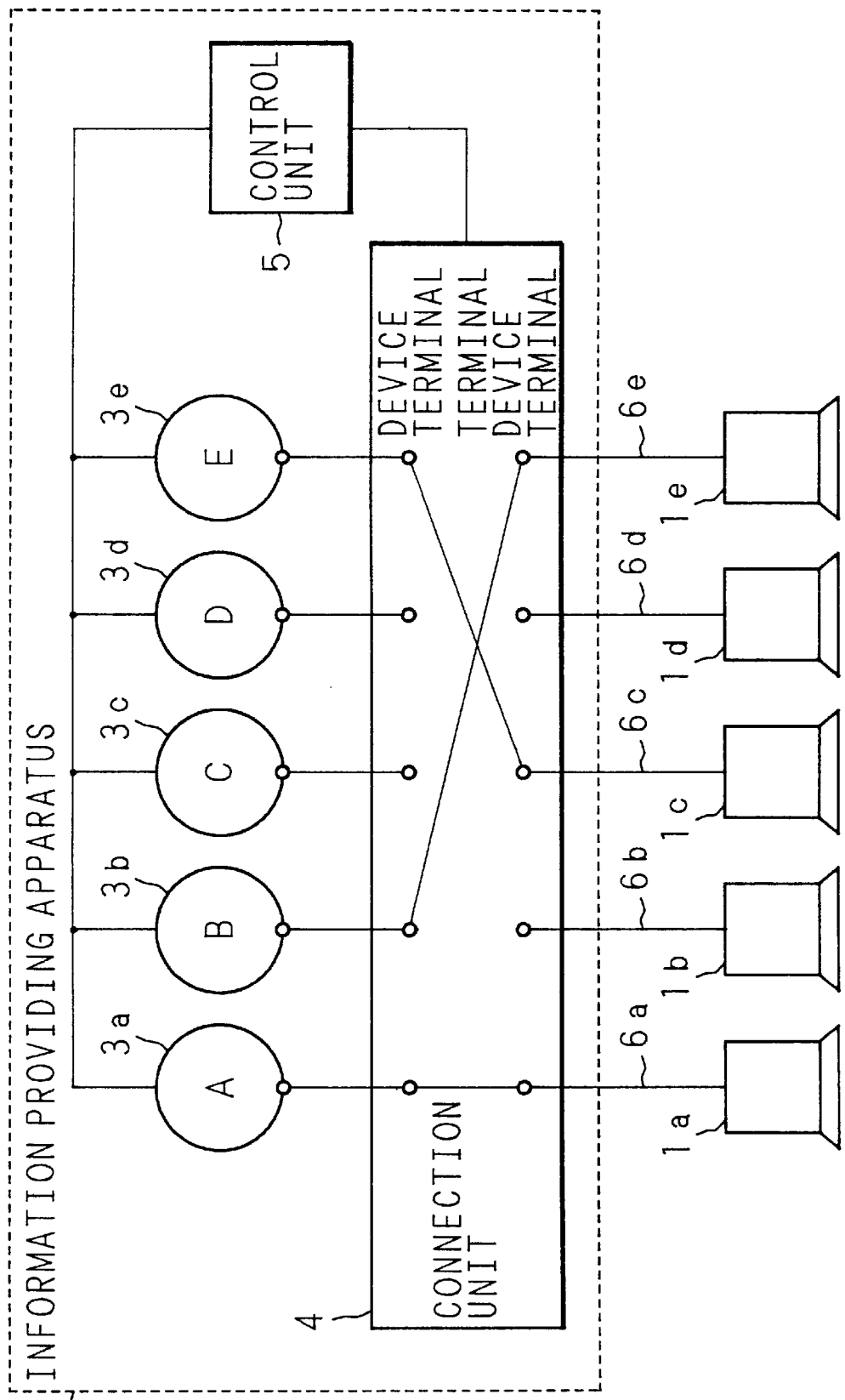
FIG. 1 is a block diagram showing an on-demand type information providing apparatus of the prior art and its periphery.
Figure 2:
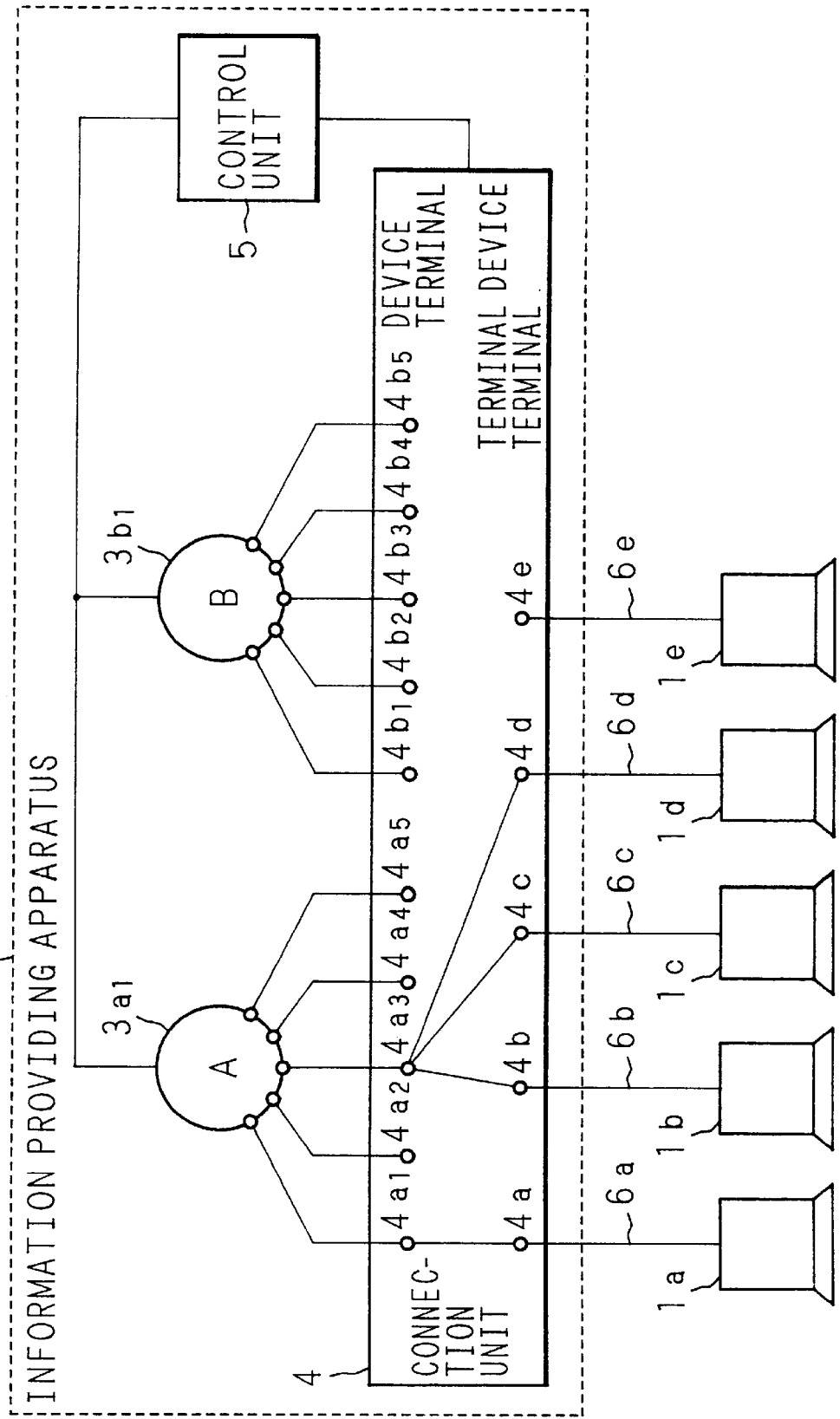
FIG. 2 is a block diagram showing a near on-demand (exchange) type information providing apparatus of the prior art and its periphery.
Figure 3:
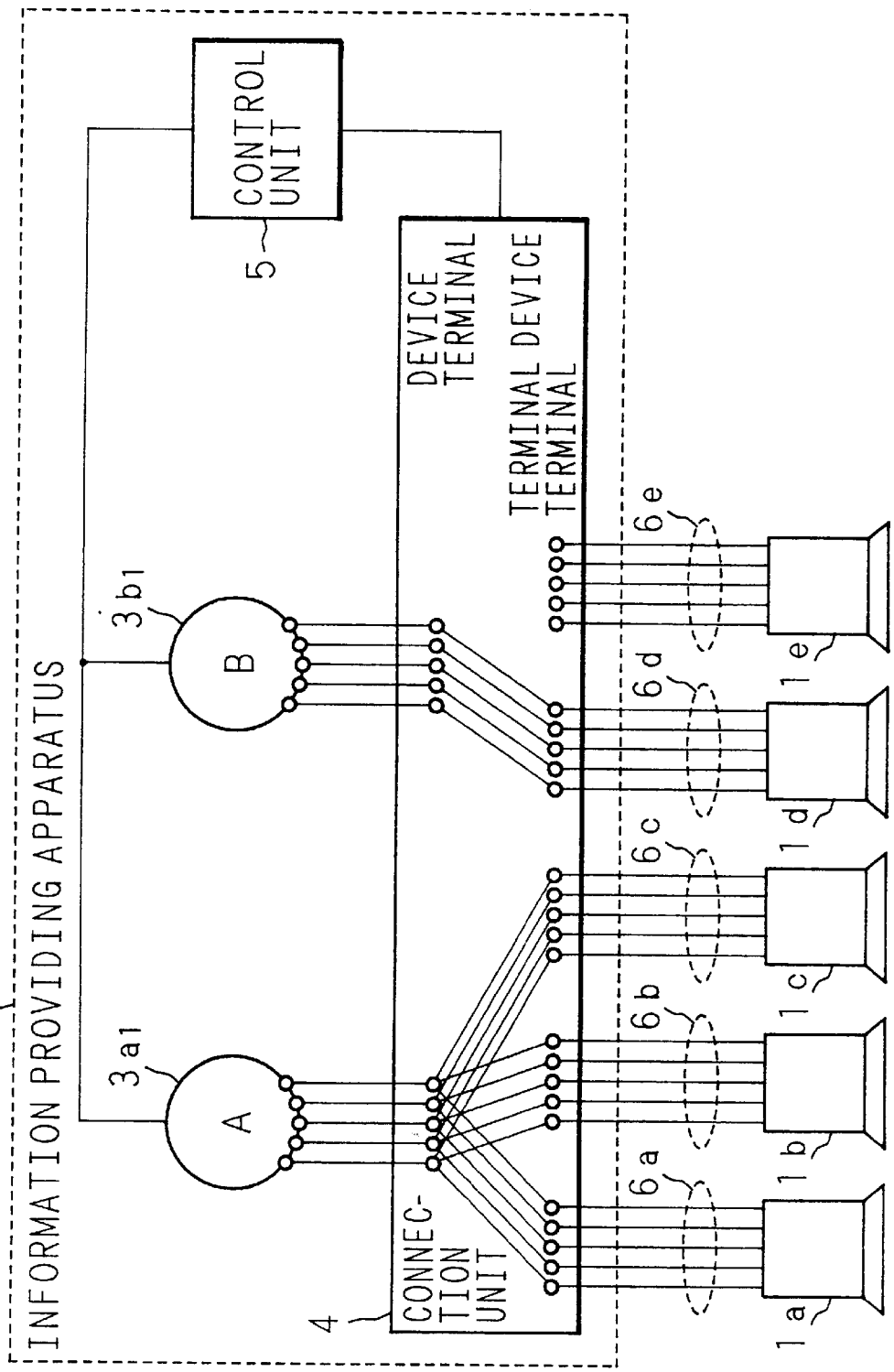
FIG. 3 is a block diagram showing a near on-demand (distribution) type information providing apparatus of the prior art and its periphery.
Figure 4:
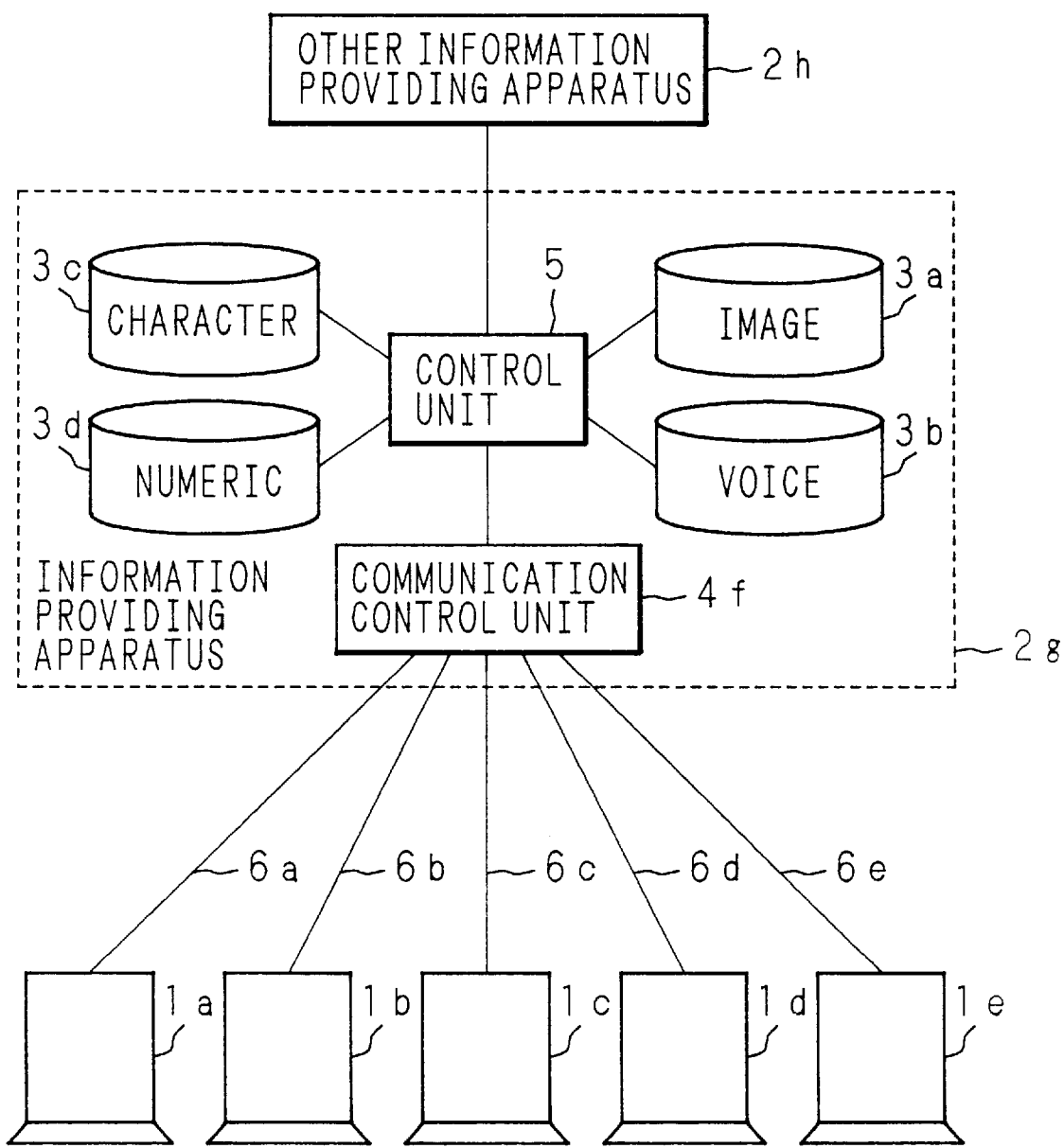
FIG. 4 is a block diagram showing a pure on-demand type information providing apparatus of the prior art and its periphery.
Figure 5:
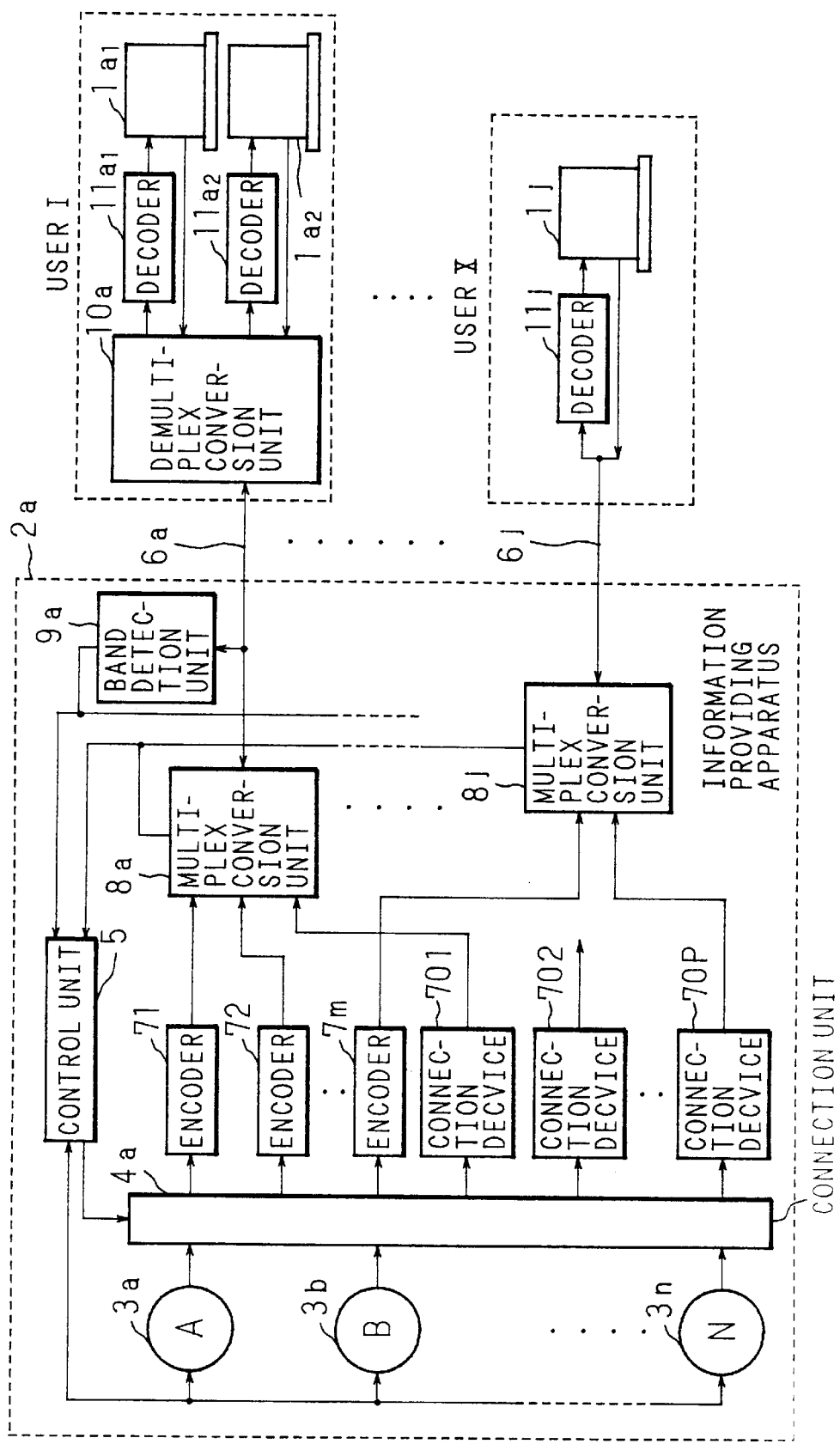
FIG. 5 is a block diagram showing an information providing apparatus according to the invention and its periphery.

FIG. 5 is a block diagram showing the configuration of an information providing apparatus of the invention and terminal devices for users. Terminal devices $1a_1$ and $1a_2$ for a user I, $1b_1$, and $1b_2$ for a user II, up to a terminal device $1j$ for a user X are connected to the information providing apparatus $2a$ via transmission lines $6a$ through $6j$.

In the information providing apparatus $2a$, each of reproduction units $3a$, $3b$ through $3n$ respectively for reproducing the programs A, B through N which stores information to be provided is connect ted to one of encoders 71, 72 through 7m and connection devices 701, 702 through 70p via a connection unit $4a$ so as to supply reproduced information. The encoders 71, 72 through 7m to which the reproduced information is supplied are compressing units compressing the information to be provided, and compress the supplied information at a predetermined compressing rate or by a predetermined compression method. The compressed information is supplied together with a code indicating the compression method, to predetermined multiplex conversion units $8a$, $8b$ through $8j$ which respectively correspond to the users. The compression methods include various systems such as MPEG-1, and compress information at respective compressing rates. The compressing rates of the encoders 71 and 72 are different from each other.

The connection devices 701, 702 through 70p adjust the level of information supplied from the connection unit $4a$, without compressing the information so as to supply to the predetermined multiplex conversion units $8a$ through $8j$ corresponding to the users. The multiplex conversion units $8a$ through $8j$ connected to the transmission lines $6a$ through $6j$ synthesize compressed or uncompressed information which is supplied from the encoders 71, 72 through 7m or the connection devices 701, 702 through 70p, and convert the information into a multiplex signal, which is then sent out to the transmission lines $6a$ through $6j$. The multiplex conversion units $8a$ through $8j$ convert also a signal which is sent from the users I through X and supplied from the transmission lines $6a$ through $6j$, and supply the converted signal to a control unit 5. Band detection units $9a$ respectively connected to the transmission lines $6a$ through $6j$ detect bands of signals under transmission in the transmission lines, and supply them to the control unit 5.

The control unit 5 receives a signal which is sent from the users I, II through X, and then instructs the reproduction unit, which stores the program demanded for by the user, so that the program is provided with being compressed or uncompressed in accordance with the demand of the user. When the user designates a compressing rate, the control unit 5 selects one of the encoders which conducts the compression at, the designated compressing rate, and, when the user does not designate a compressing rate, the control unit 5 selects any of the connection devices. Then, the reproduction unit which is instructed to conduct the reproduction and the selected encoder or connection device are connected to each other in a one-to-one relationship via the connection unit 4a. In this connection, when the resources in the information providing apparatus 2a are currently occupied, for example, when an optical video disk is available but the loading device for loading the optical video disk to the reproduction device is occupied, the control unit 5 determines a period which is to be required before the connection is made. When the reproduction is completed, the reproduction units 3a, 3b through 3n notify the completion of the reproduction to the control unit 5. The control unit 5 sends out the information demanded by the user, to the transmission line.

The user I has plural terminal devices. A demultiplex conversion unit 10a converts the multiplex signal which is sent from the transmission line 6a, and assorts the signal to decide to which decoder, i.e., a decoder $11a_1$ or $11a_2$, the signal is to be supplied. In accordance with the assortment, the multiplex signal is separated and the separated signals are supplied to the decoders $11a_1$ and $11a_2$, respectively. In the case where the separated information is a compressed one, the information is supplied together with a code designating the restoration system, to the decoders $11a_1$ and $11a_2$. Then, the decoder $11a_1$ restores the compressed information on the basis of the designated code, and uncompressed information is supplied to the terminal device $1a_1$ as it is. The information is then outputted by a display device or a loudspeaker which is not shown.

The terminal device $1a_1$ supplies to the demultiplex conversion unit 10a a signal which indicates a demand or a registration of the program. When a signal corresponding to a demand of the program is supplied, the demultiplex conversion unit. 10a seizes the transmission line 6a and sends out a program demand signal. When a signal corresponding to a registration of the program is supplied, the multiplex conversion unit sends out the program demand signal so that the signal is supplied to the information providing apparatus 2a.

The decoder $11a_2$ operates in the same manner as the decoder $11a_1$, and the terminal device $1a_2$ in the same manner as the terminal device $1a_1$. The user X has one terminal device. A decoder 11j connected to the transmission line 6j converts the multiplex signal supplied from the transmission line 6j. When the converted information is a compressed one, the decoder 11j restores the supplied information on the basis of the code that designates the restoration system and is included in the information. When the converted information is an uncompressed one, the information is supplied to the terminal device 1j as it is. The terminal device 1j conducts a multiplex conversion on a signal which corresponds to a demand or a registration of the program, and sends out the signal to the transmission line 6j.

In order that, when plural terminal devices are connected to one transmission line as described above, information is compressed and then provided in accordance with a demand of a user, the control unit 5 comprises three kinds of management tables for managing the transmission band of the transmission line.

FIG. 6 shows an example of an information band management table which is stored in a memory (not shown) of the control unit 5. In the table, compression methods which are employed in the information providing apparatus 2a are listed in the column of the compression method, compressing rates respectively corresponding to the compression methods are listed in the column of the compressing rate in the form of a fraction having an information amount after compression as the numerator and that before compression as the denominator, and data transmission speeds necessary for transmitting the compressed data by the respective compression methods are listed in the column of the necessary band. When a user designates a compression method with reference to the information band management table, the control unit 5 can attain the compressing rate and the necessary band which correspond to the compression method.

More specifically, the table shows that, MPEG-1 has a compressing rate of 1/30 and requires a band in which data can he transmitted at a data transmission speed of 1,500 kbps, that Video1 has a compressing rate of 1/10 and requires a band in which data can be transmitted at a data transmission speed of 2,400 kbps, and that Indeo has a compressing rate of 1/15 and requires a band in which data can be transmitted at a data transmission speed of 1,200 kbps. In JPEG, the compressing rate is variable, and hence also the necessary band is variable.

FIG. 7 shows an example of a service provision management table which is stored in the memory of the control unit 5 and which is recorded at the time when a program demand from a user is issued. In the table, symbols I-1, I-2, II-1, II-2 through X indicating the terminal devices $1a_1$ through 1j of the users I to X are listed in the column of the user terminal device identification symbol, and programs designated by the users are listed in the column of the program identification symbol. Furthermore, compression methods designated by the users are listed in the column of the compression method, and compressing rates corresponding to the compression methods are listed in the column of the compressing rate with reference to the information band management table. When a compression method is not designated, a compression method and a compressing rate are not listed. The control unit 5 can attain the program provided in the terminal device for a user and its compressing rate, with reference to the service provision management table.

More specifically, the table shows that the terminal device $1a_1$ of the identification symbol I-1 is provided with the program A by the compression method of MPEG1 at a compressing rate of 1/30, that the terminal device $1a_2$ of the identification symbol I-2 is provided with the program B by the compression method of Video1 at a compressing rate of 1/10, that the terminal device of the identification symbol II-1 is provided with the program C by the compression method of Motion JPEG at a compressing rate of 1/50, that the terminal device of the identification symbol II-2 is provided with the program D by the compression method of Indeo at a compressing rate of 1/15, and the terminal device 1j of the identification symbol X is not provided with any program.

FIG. 8 shows an example of a transmission band management table which is stored in the memory of the control unit 5 and which manages occupied bands in the transmission lines. In the table, 001, 002 through 00j which are symbols indicating the transmission lines 6a through 6j are listed in the column of the user transmission line identification, and bands occupied for the program provision are listed in the column of the occupied band as data transmission speeds which are required for providing the respective programs. Information of the occupied bands is supplied from band detection units which correspond to the respective transmission lines. Specifically, the transmission lines 6a, 6b, and 6j of the user transmission line identification symbols 001, 002 and 00j transmit the data at bandwidths of 9,600 bps, 64 kbps, 10 Mbps and 156 Mbps, respectively. The control unit 5 manages the transmission bands of the transmission lines 6a through 6j using a table which is not shown. For one transmission line, an available band is obtained by subtracting the occupied band which is detected by the band detection unit 9a, from the transmission band which is managed with the table. This functions as detecting means. The compressing rate and necessary band in each case of compression and uncompression of the programs A through N are managed with another table which is not shown. When a user issues a demand for utilizing a program via a terminal device while utilizing another program via another terminal device, the control unit 5 searches an available band, and selects a program which can be provided in the available band. This functions as a selecting unit. Then, the selected program is displayed on the terminal device for the user.

Figure 9:
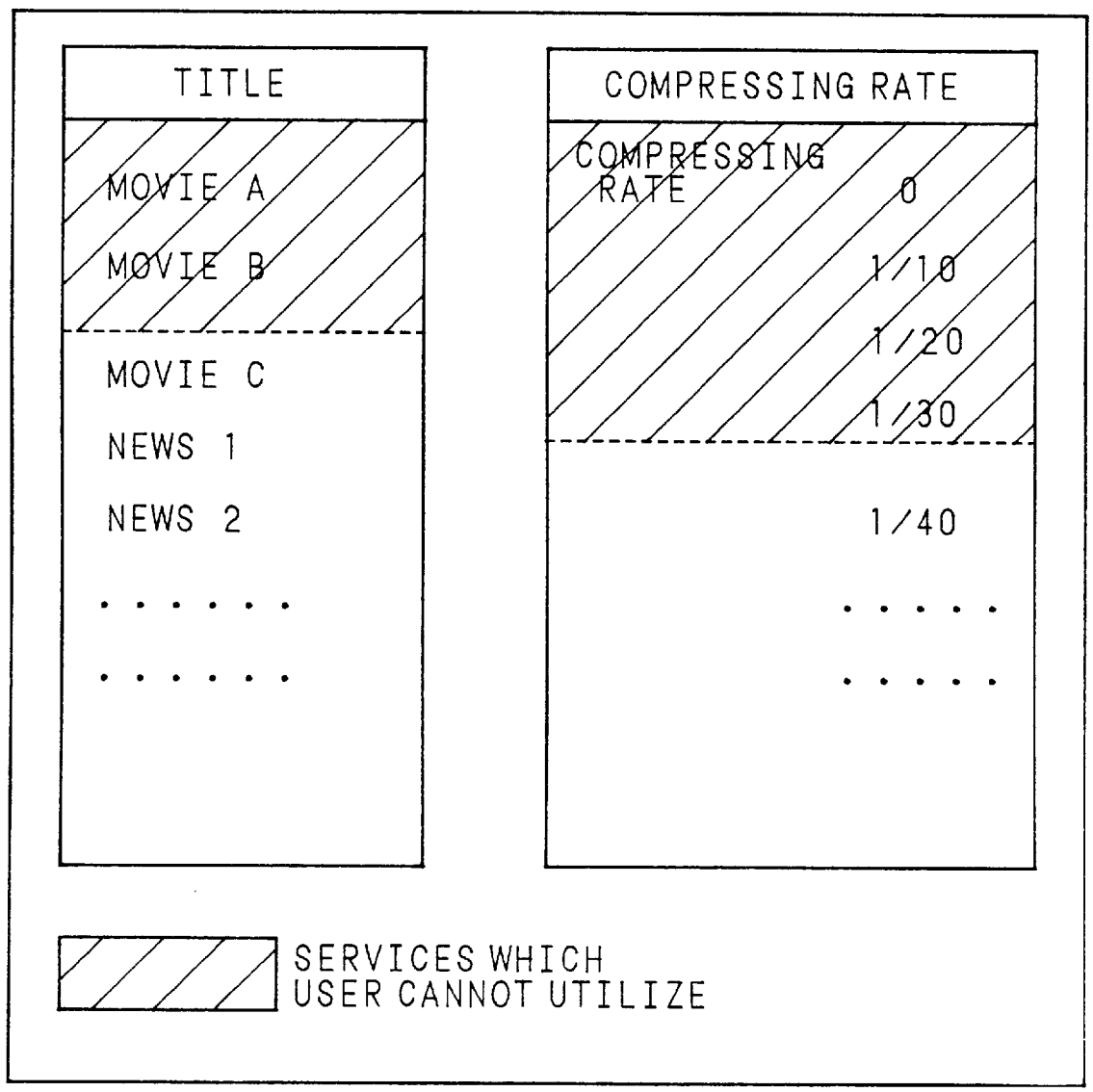
FIG. 9 shows a list of available services which is displayed on a terminal device shown in FIG. 5.

FIG. 9 shows an example of a list of available services which is displayed on the terminal device for the user in the case where the available band is 10 Mbps. The available service list is displayed with being divided into a title region and a compressing rate region. In the list, dotted portions indicate the services which the user cannot utilize. In this specific case, the user selects a desired program which is available at a compressing rate of 1/40 or lower, with reference to a service book on band, or directly selects one from the programs displayed on the screen.

When plural terminal devices are connected to one transmission line as described above, the information providing apparatus 2a can provide information to be provided, with compressing the information by a compression method suitable for the plural terminal devices, or without compressing the information.

Figure 10:
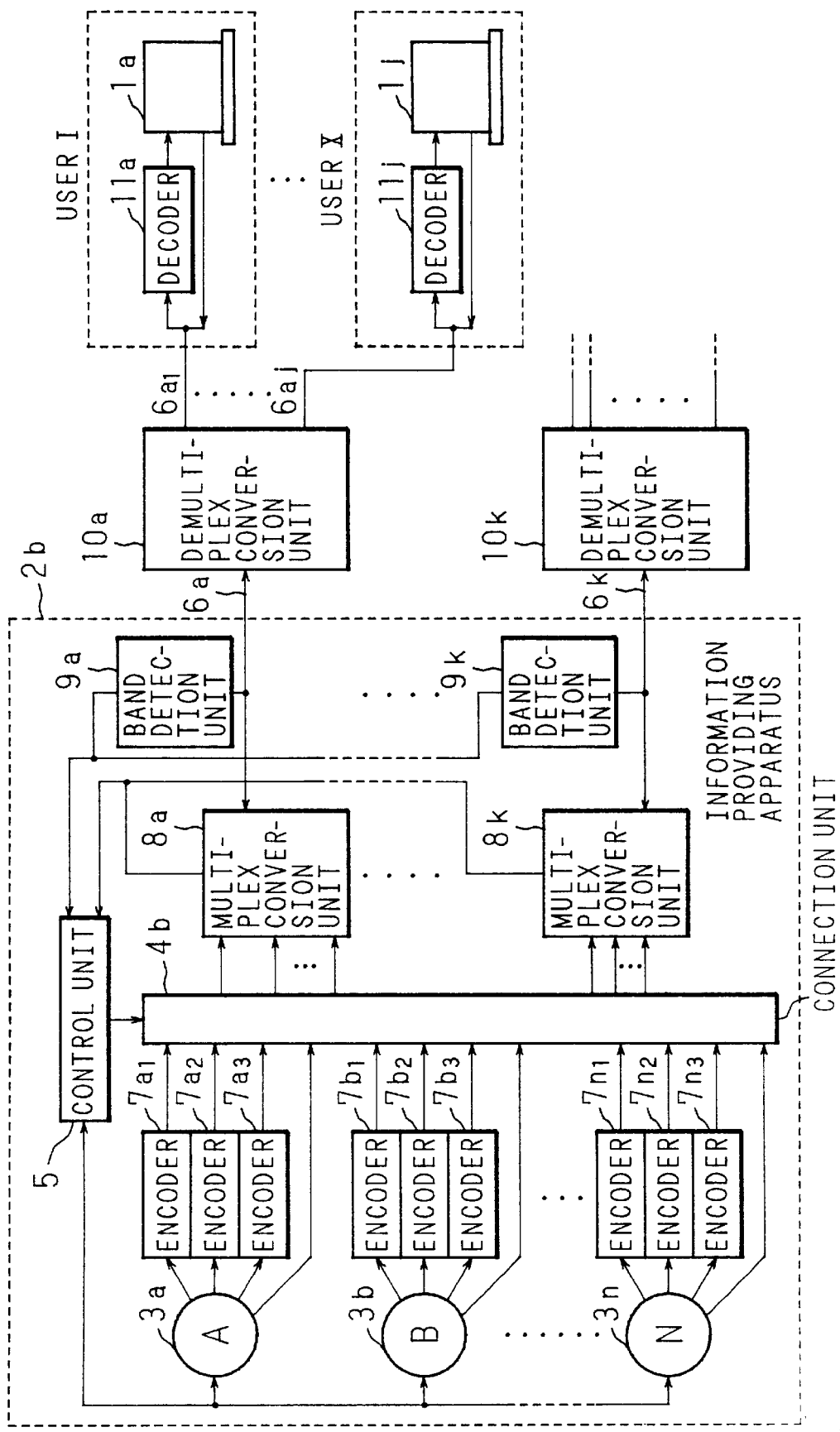
FIG. 10 is a block diagram showing an information providing apparatus according to the invention and its periphery.

FIG. 10 is a block diagram of another embodiment of the invention in which an information providing apparatus 2b is connected to terminal devices $1a_1$ and $1a_2$, $1b_1$ and $1b_2$ up to 1j respectively for the users I, II through X via transmission lines 6a through 6j.

In the information providing apparatus 2b, a reproduction unit 3a for reproducing the program A which stores information to be provided is connected to a connection unit 4b via encoders $7a_1$, $7a_2$ and $7a_3$, and directly to the connection units 4b, and supplies reproduced information. The encoders $7a_1$, $7a_2$ and $7a_3$ are the compressing means for compressing the program A at different compressing rates or by different compression methods in accordance with different transmission bands of the transmission lines 6a through 6k, and compress supplied information at predetermined compressing rates or by predetermined compression methods. In the same manner as the reproduction unit 3a, reproduction units 3b to 3n for reproducing the programs B through N are connected to the connection unit 4b via encoders $7b_1$, $7b_2$ and $7b_3$ through $7n_1$, $7n_2$ and $7n_3$, and directly to thee connection unit 4b, and supply reproduced information. The encoders $7b_1$, $7b_2$ and $7b_3$ through $7n_1$, $7n_2$ and $7n_3$ are the compressing means for compressing the programs B through N at different compressing rates and compress supplied information by predetermined compression methods.

The connection unit 4b is connected to multiplex conversion units 8a through 8k via plural connection lines. For either compressed or uncompressed information from programs A, B, through N to be supplied to the multiplex conversion units 8a through 8k, which correspond to users I, II, through X, the encoders $7a_1$, $7a_2$, and $7a_3$, $7b_1$, $7b_2$, and $7b_3$, through $7n_1$, $7n_2$, and $7n_3$, and the reproduction units 3a, 3b, through 3n for the programs A, B, through N, are connected to the multiplex conversion units 8a through 8k in a one-to-one relationship under the controlk of the control unit 5. The connection unit 4b is connected to the multiplex conversion units 8a through 8k via the plural connection lines.

The control unit 5 receives a signal sent from one of the users I through X, and selects one of the reproduction units 3a, 3b through 3n which reproduces information of a program designated by the user, and one of the encoders which compresses the information at a compression rate designated by the user. The control unit 5 controls the connection unit 4b so that the selected reproduction unit and encoder are connected to the multiplex conversion unit (8a through 8k) corresponding to the user. One set of demultiplex conversion units 10a through 10k is disposed in one region such as a town or a village, so as to conduct transmission between terminal devices for users in the region and the information providing apparatus 2b. The input port of the demultiplex conversion unit 10a is connected to the transmission line 6a, and the output port is connected to the terminal devices 1a through 1j for the users I to X via plural transmission lines $6a_1$ through $6a_j$. The input port of the demultiplex conversion unit 10k is connected to the transmission line 6k, and the output port is connected via plural transmission lines to terminal devices (not shown) for plural users. The transmission bands of the transmission lines 6a through 6j are not identical with one another. The other configuration is the same as that of FIG. 5. The same components are designated by the same reference numerals, and their description is omitted.

As described above, information of any of the programs A, B through N is compressed by the three kinds of encoders or not compressed so that the information can be output as four kinds of information, or compressing units which conform to bands of various transmission lines is disposed, whereby the transmission is prevented from being restricted by the band specifications of the transmission lines which are established when the information providing apparatus is installed.

The control units 5 shown in FIGS. 5 and 10 manage a fee for providing information, in accordance with the compressing rate of the provided information.

Figure 11:
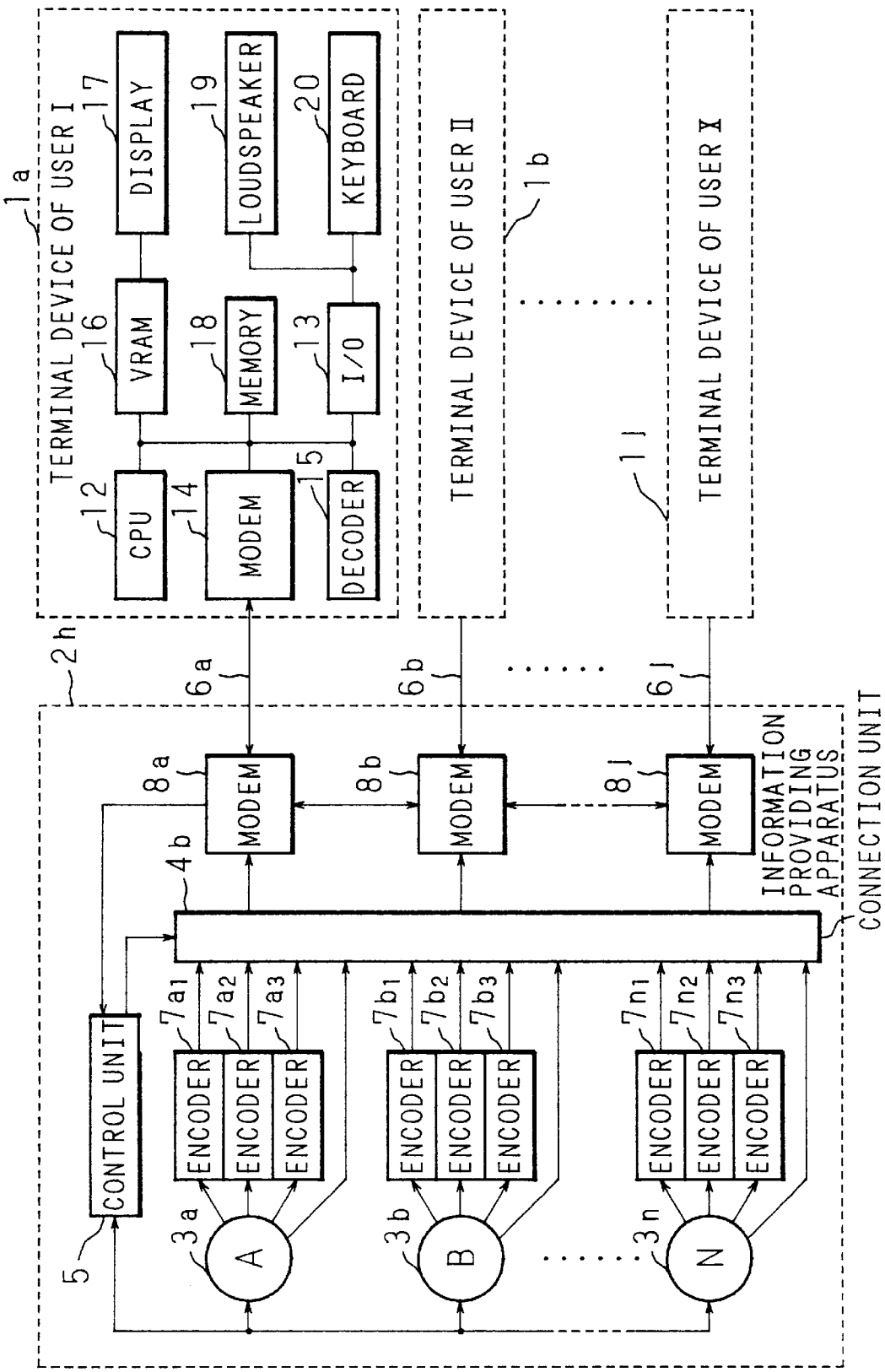
FIG. 11 is a block diagram showing an information providing apparatus using chargeable lines and its periphery.

FIG. 11 is a block diagram of still another embodiment of the invention in which an information providing apparatus 2h is connected to terminal devices 1a, 1b through 1j for users via transmission lines 6a through 6j which are chargeable lines such as public lines. In the figure, modems 8a, 8b through 8j modulate compressed or uncompressed information supplied from the connection unit 4b and supply the modulated information to the chargeable lines 6a through 6j. The modems demodulate a signal which is supplied via the lines from the terminal devices 1a, 1b through 1j and which demands or registers a program, and supply the demodulated signal to a control unit 5. The control unit 5 comprises a disconnecting unit disconnecting the apparatus from the line when a wait period is required, and a connecting unit, at the time when the demanded program can be provided, connecting the apparatus to the line which has been disconnected, for transmitting the program.

When the user I operates the terminal device 1a with a keyboard 20 thereof, a CPU 12 detects the operation via an I/O interface 13, produces a program demand signal or a program registration signal, and sends out the signal to the chargeable line 6a via a modem 14. When the program is provided in the form of compressed information, the CPU 12 detects via the modem 14 the information being compressed, and controls a decoder 15 so as to restore the compressed information on the basis of a code designating the restoration system. When the information restored by the decoder 15 or the uncompressed information which is received by the modem 14 is image data, character data, or numeric data, the CPU 12 controls a display device 17 via a VRAM 16 so that the information is displayed on the display device 17. When the information is voice data, the CPU 12 controls a loudspeaker 19 via the I/O interface 13 so that the information is outputted by the loudspeaker.

Figure 12:
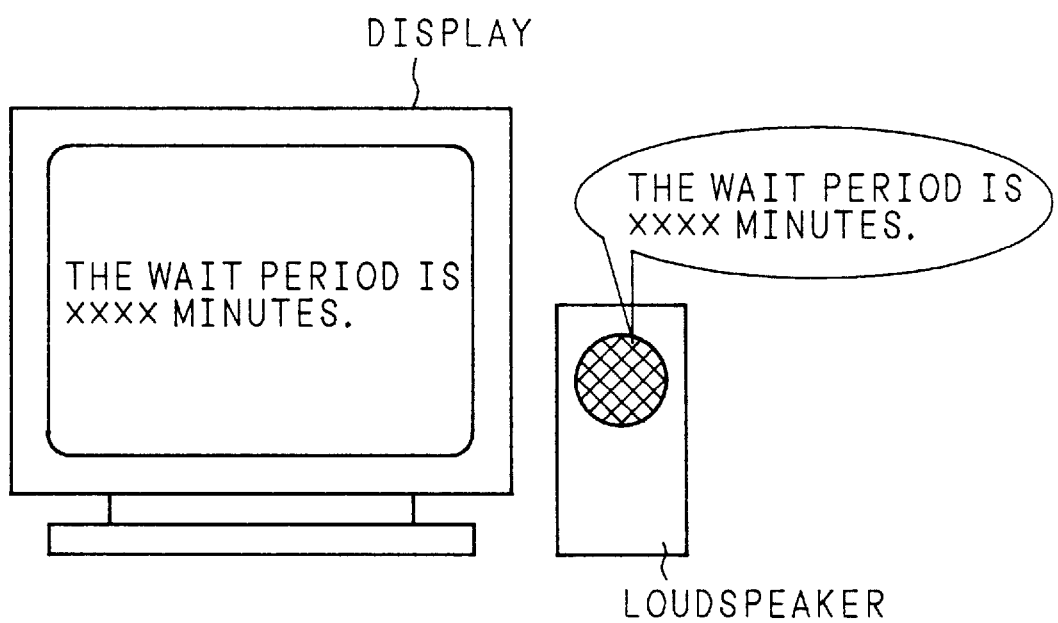
FIG. 12 is a diagram showing a method of providing a wait time.

FIG. 12 is a diagram showing an image displayed on the display device and contents of the announcement by the loudspeaker in the case where a wait period is provided. The terminal devices 1b through 1j for the users II through X are structured in the same manner as the terminal device 1a. The other configuration is the same as that, of FIG. 10. The same components are designated by the same reference numerals, and their description is omitted.

Since the apparatus is disconnected from the line during the wait period as described above, the line charge can be reduced.

FIG. 13 shows an example of a fee management table according to a compressing rate which is stored in the memory of the control unit. 5. In the table, the user identification symbol and the compressing rate are the same as those of FIG. 6. The compression service fee $S_1$ is a fee which is charged in the case where a compressed program is provided. When the denominator of a compressing rate is large, the fee is set to be lower, and, when the denominator of a compressing rate is small, the fee is set to be higher. The basic fee $B_1$ is set in accordance with the popularity of a program so as to be high for a program of a high rating and to be low for a program of a low rating. The total $E_1$ is a sum of the compression service fee $S_1$ and the basic fee $B_1$. The fee management table according to a compressing rate is recorded at the time when the service provision management table is recorded in response to at program demand from a user. When the provision of the program is completed, the contents of the fee management table are totalized in a fee totalization table which is not shown. The fees according to the compressing rate are totalized in the fee totalization table at the end of a term, and then charged to the user.

Figure 14:
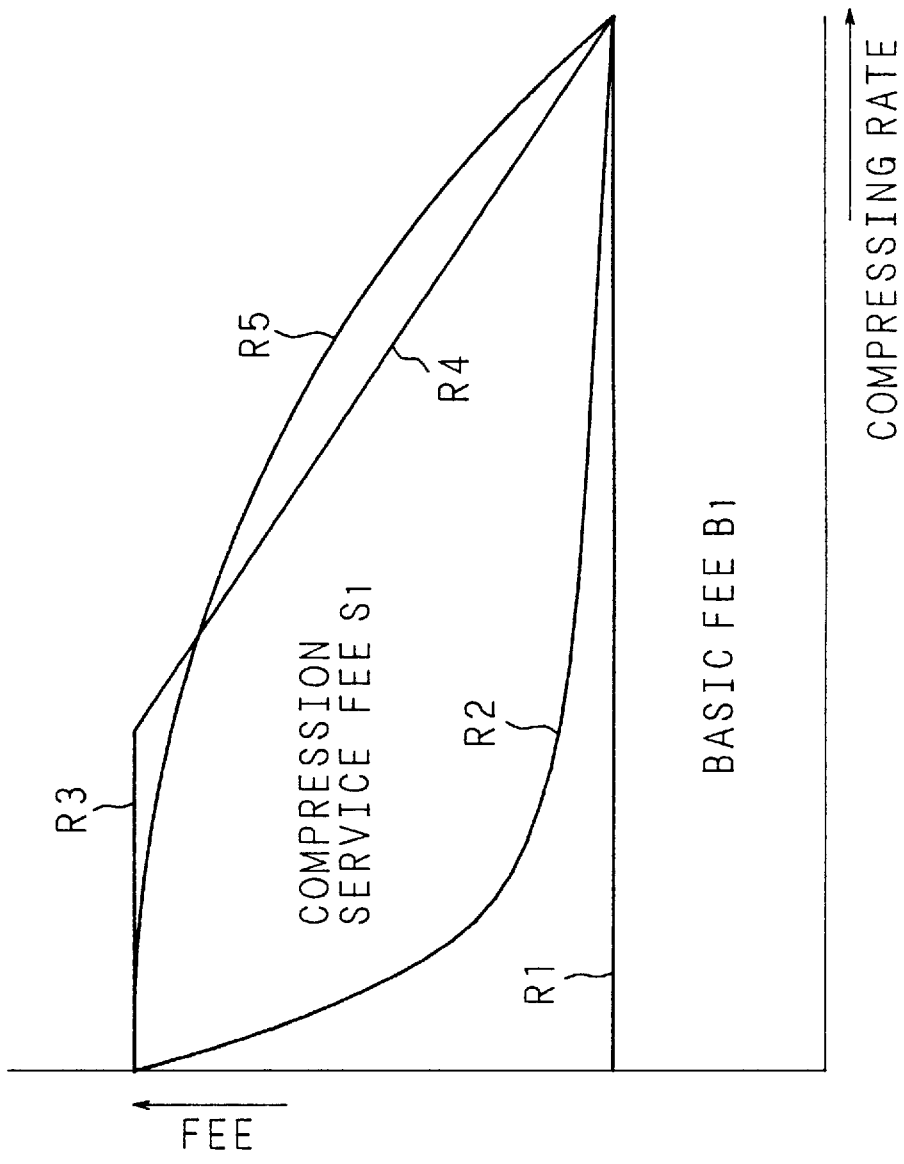
FIG. 14 is a graph showing the relationships between a compressing rate and a fee in the control units shown in FIGS. 5 and 10.

FIG. 14 shows an example of a fee curve showing the relationships between the compression service fee $S_1$ and the basic fee $B_1$, and a compressing rate. The graph is stored in the memory of the control unit 5. In the graph, as the compressing rate moves rightward, the denominator of the compressing rate is greater. The line $R_1$ indicates the basic fee $B_1$ and the fee is constant irrespective of the compressing rate. The curve $R_2$ indicates a system in which, if the provided information is compressed to any extent, the fee is largely reduced, and this system is applied to a program wherein compression causes intelligibility to be suddenly lowered. The line $R_3$ indicates a system in which the fee for compressed information is kept equal to that of uncompressed information until the compressing rate reaches a predetermined low compressing rate. The line $R_4$ indicates a system in which, when the denominator of the compressing rate is larger than that of the predetermined low compressing rate, the fee is reduced. Both systems of the lines $R_3$ and $R_4$ are applied to a video program or the like in which a low compressing rate causes a visually recognizable difference in quality between compressed information and uncompressed one. The curve $R_5$ is obtained by smoothing the bend between the lines $R_3$ and $R_4$.

As described above, a fee curve according to a compressing rate is preset, and the compression service fee $S_1$ may be determined in accordance with utilization results of the user, whereby a fee is allowed to be charged in accordance with the compressing rate. This functions as account means for deciding a fee for providing information, in accordance with the compressing means. In order to determine a period which is to be required before the demanded program is provided, each of the control units 5 shown in FIGS. 5 and 10 comprises two kinds of management tables.

FIG. 15 shows an example of a program utilization state management table which is stored in the memory of the control unit 5. In the table, identification symbols A, B through N of programs which are managed by the control unit 5 are listed in the column of the program identification symbol. Before the service is started, in all the lines in the column of the utilization state are indicated "available", and nothing is indicated in the column of the end time. When the program A is demanded and thee provision of the program A is started, "occupied" is indicated in the line of the column of the utilization state corresponding to the program A, and a time required to finish providing the program A is indicated in the unit of "minute" in the end time column. The value indicated in the end time column is decremented by one minute with time. Referring to the line corresponding to the program B, the control unit 5 identifies that the program B is "available", and, referring to the line corresponding to the program N, the control unit 5 identifies that, at the time of the reference, a time remained to finish providing the program N is 30 minutes. The control unit 5 has determining means for, in accordance with the utilization state of the resources in the information providing apparatus, determining a period between the time when a user demands a program and that when the program is ready to he provided. When the completion of the program is notified by the reproduction unit, the control unit 5 changes the indication in the utilization state column corresponding to the program to "available", and that in the end time column to indicate nothing. The control unit 5 further has notifying means for notifying the period determined by the determining means to the terminal device. In the terminal device which receives the notification, the display device (not shown) displays "WAIT PERIOD IS . . . MIN", and the loudspeaker (not shown) announces "The wait period is . . . minutes." When the user wishes to view or listen to the program after the wait period, the user makes reservation of the program.

FIG. 16 shows all example of a service registration table which is stored in the memory of the control unit 5, and in which a program reserved by a user is registered. The user identification symbols I, II through X of the users which are managed by the control unit 5 are listed in the column of the user identification symbol, programs designated by the risers are listed in the column of the program identification symbol, Compression methods designated by the users are listed in the column of the compression method, compressing rates corresponding to the compression methods are listed in the column of the compressing rate with reference to the information band management table, and the numerals in the end time column corresponding to the program identification symbol which are in the program utilization state management table at, the time when the user reserves the program are transferred to the wait period column. Specifically, the user I has made reservation so as to view or listen to the program N with a compression method of MPEG-1 at a compressing rate of 1/30, and the wait period is 30 minutes. The user II has made reservation so as to view or listen to the program A with a compression method of Video1 at a compressing rate of 1/10, and the wait period is 11 minutes. The user X has made no reservation of any program.

The value registered in the wait period column is decremented by one minute with time. The control unit 5 comprises registration means. When the completion of the reproduction of information is notified by the reproduction unit, the registration means clears the corresponding line in the wait period column. The control unit 5 comprises sending means, and always monitors the service registration table. When the value of the wait period column is cleared from the indication of "0", the sending means sends out the information to the transmission line so that the program listed in the corresponding line in the program identification symbol column is provided to the corresponding user. The Control units 5 shown in FIGS. 5 and 10 manage the fee of the program provision in accordance with the period which is required until the start of the program provision, i.e., the wait period of the user.

FIG. 17 shows an example of a fee management table in accordance with a wait period of a user which is stored in the memory of the control unit 5. In the table, the user identification symbols and the wait periods are the same as those of FIG. 16. The service fee $S_2$ is a fee which is charged when a user utilizes a program after a wait period. When the wait period is long, the fee is set to be lower, and, when the wait period is short, the fee is set to be higher. The basic fee $B_2$ is set in accordance with each program. The total $E_2$ is a sum of the service fee $S_2$ and the basic fee $B_2$. When this table and the fee management table shown in FIG. 13 according to a compressing rate are used together, either of the basic fees $B_1$ and $B_2$ may be omitted.

The fee management table according to a wait period is recorded at the time when the service registration table is recorded in response to the program reservation by a user. When the provision of the program is completed, the contents of the fee management table are totalized in the fee totalization table.

Figure 18:
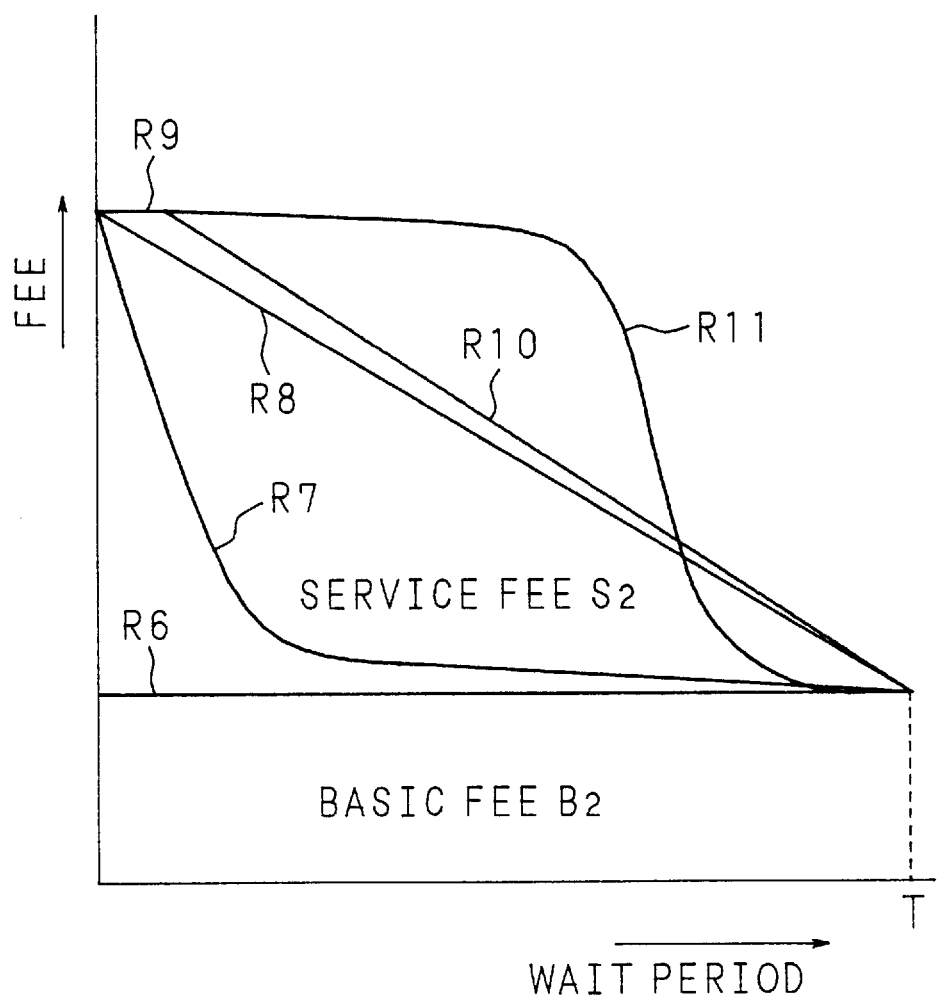
FIG. 18 is a graph showing the relationships between a fee and a wait period of the control units shown in FIGS. 5 and 10.

FIG. 18 shows an example of a fee curve showing the relationships between the service fee $S_2$ and the basic fee $B_2$, and a wait period. In the graph, T indicates a limit period which can be regarded as a wait period and which is a determined on the basis of the average provision period of program. The line $R_6$ indicates the basic fee $B_2$ that is constant irrespective of the wait period. The curve $R_7$ indicates a system in which, if any wait period is required, the fee is largely reduced, and which is applied to a news program or the like which is worth in immediate provision. The line $R_8$ indicates a system in which a fee is reduced in proportion to a wait period. The line $R_9$ indicates a system in which a short wait period is not reflected in the fee reduction. The line $R_{10}$ indicates a system in which, when a wait period is longer than the short wait, period, a fee is reduced in proportion to the difference between the wait period and the short wait period. The line $R_{11}$ indicates a system in which the fee is largely reduced when a wait, period is longer than one half of the average provision period. As described above, a fee curve according to a wait period is preset, and the service fee $S_2$ may be determined in accordance with the utilization results of the user, whereby a fee is allowed to be charged in accordance with the wait period. This functions as means for deciding a fee for providing information, in accordance with the period which is to be required before a program is provided.

Figure 19:
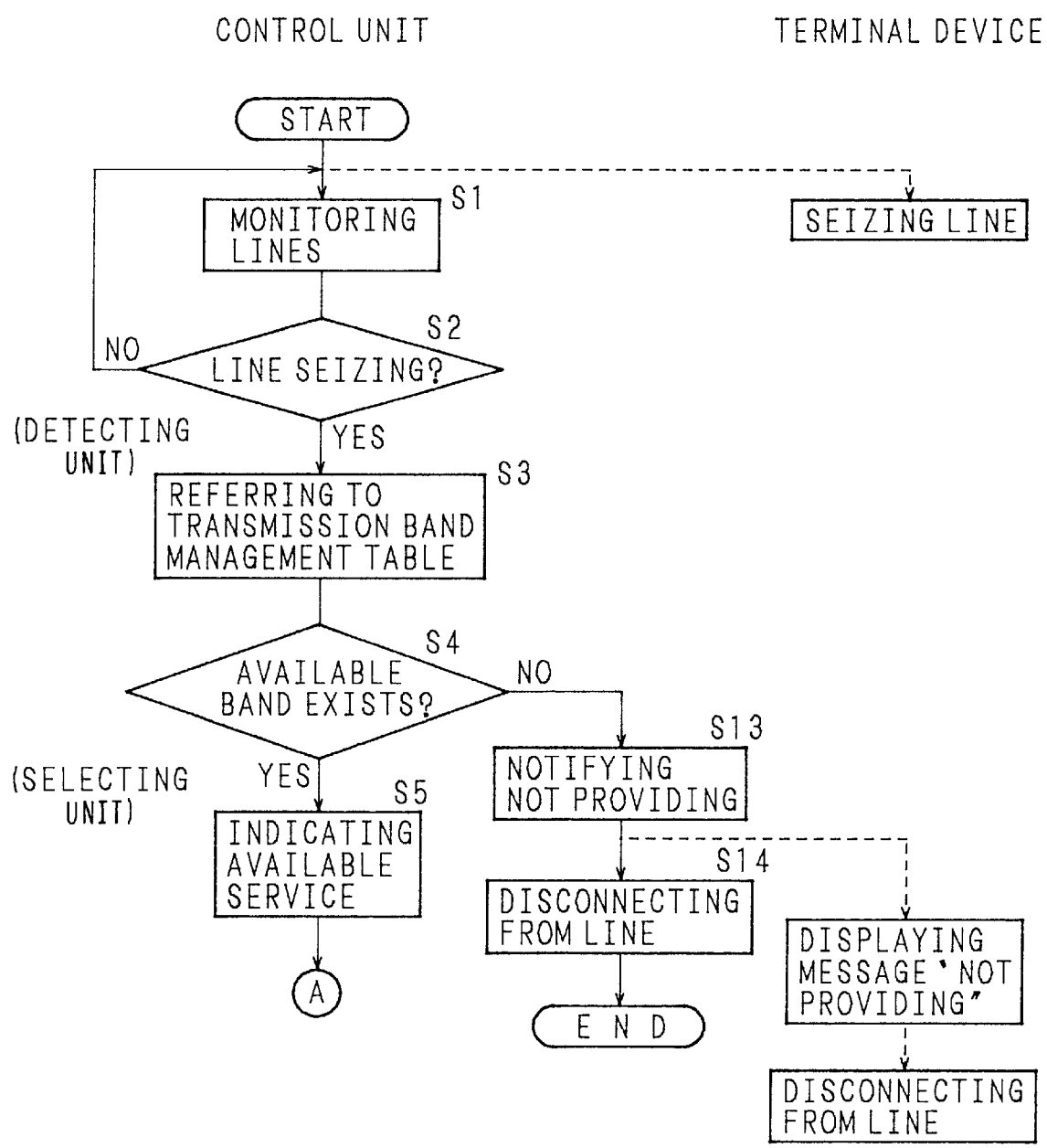
FIG. 19 is a flowchart showing the procedure of providing information in the information providing apparatus according to the invention.
Figure 20:
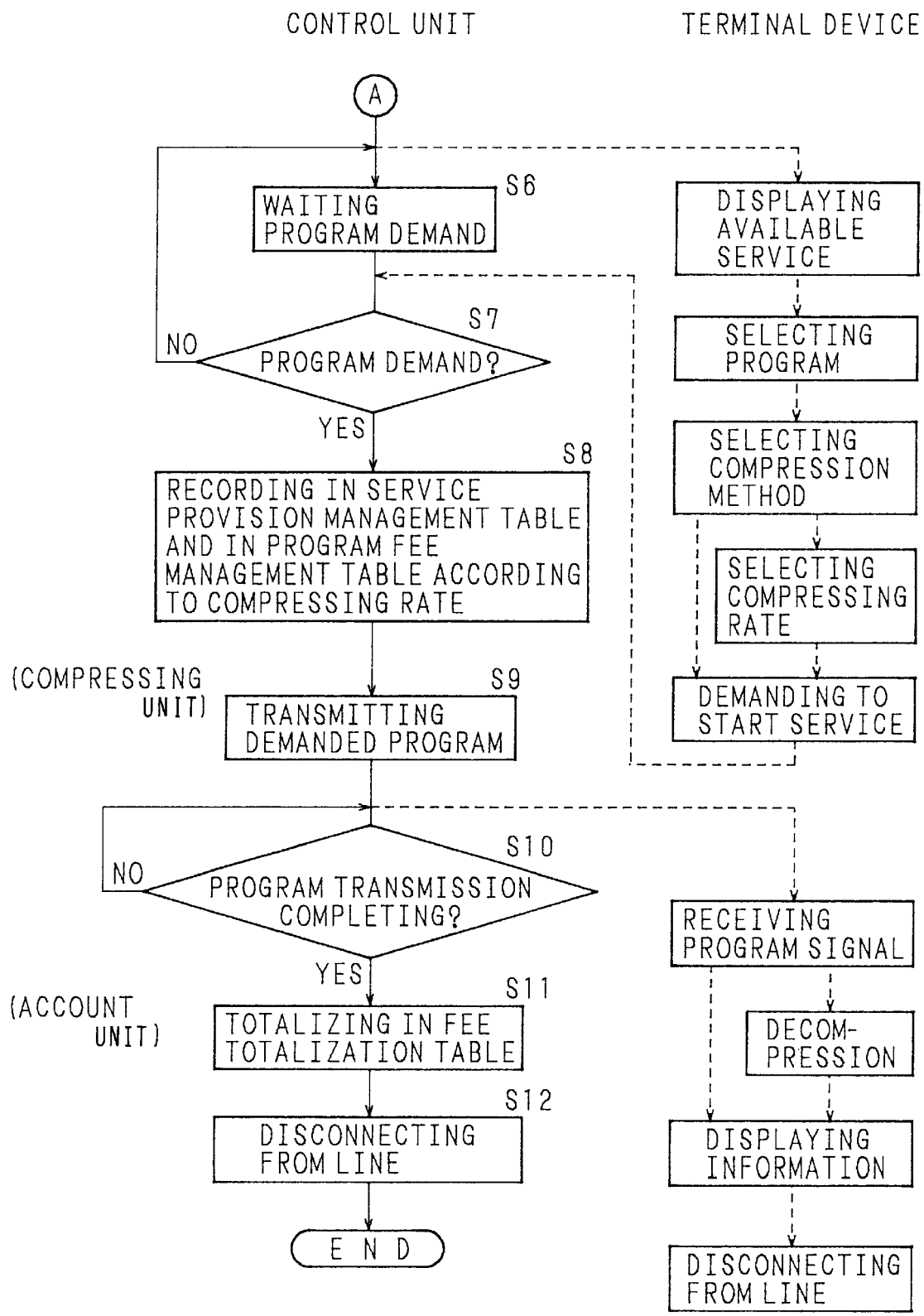
FIG. 20 is a flowchart showing the procedure of providing information in the information providing apparatus of the invention.

FIGS. 19 and 20 are flowcharts showing the procedure of, in the case where the transmission lines in FIG. 5 are chargeable lines, indicating to a user programs which can be provided in accordance with the state of the bands of the lines by the control unit 5, and providing one of the programs. In the flowcharts, the operations of the user conducted on the terminal device are also shown. The control unit, 5 always monitors the lines in order to provide a program to a user (step S1). The user seizes a line in order to inquire whether an appropriate program is available. The control unit 5 judges whether the user seizes a line or not. (step S2). If NO, the process returns to step S1. If YES, the transmission band management table is referred to (step S3), an available band is detected by subtracting the occupied band from the transmission band of the line so as to judge whether the available band exists or not from the subtraction result (step S4). If YES, an available service is selected in accordance with the available band, and the selected service is indicated to the user (step S5). The available service list. (see FIG. 9) is displayed on the terminal device for the user.

The user selects a program from the available service list, and selects a compression method. Among compression methods, there are systems such as Video2, and Indeo in which a compressing rate can be designated. When such a system is selected, also the compressing rate is designated. The compressing rate is designated in the form of a data transmission speed, for example, as 150 kbps, 300 kbps, or the like. Thereafter, the user demands the service to be started. The control unit 5 waits for a program demand (step S6), and judges whether the program demand is issued or not (step S7). If NO, the process returns to step S6. If YES, the contents of the demand are recorded in the service provision management table, and also in the program fee management table according to the compressing rate (step S8). Then, the demanded program is sent out to the transmission line with being compressed or uncompressed in accordance with the service provision management table, so as to be transmitted to the terminal device (step S9).

The terminal device receives signals of the transmitted program. When the program is compressed, it is restored, and, when it is uncompressed, it is displayed on the display device as it is. When the reception is completed, the terminal device is disconnected from the line. The control unit 5 judges whether the program transmission is completed or not (step S10). If NO, the judgment is continued. If YES, the contents recorded in the program fee management table according to the compressing rate are totalized in the fee totalization table (step S11), and the apparatus is then disconnected from the line (step S12). If it is judged in step S4 that an available band does not exist, it is notified that, a program cannot be provided (step S13), and the apparatus is then disconnected from the line (step S14). In this case, a message that a program cannot be provided is displayed on the terminal device for the user, and the user controls the terminal device so that the device is disconnected from the line.

Figure 21:
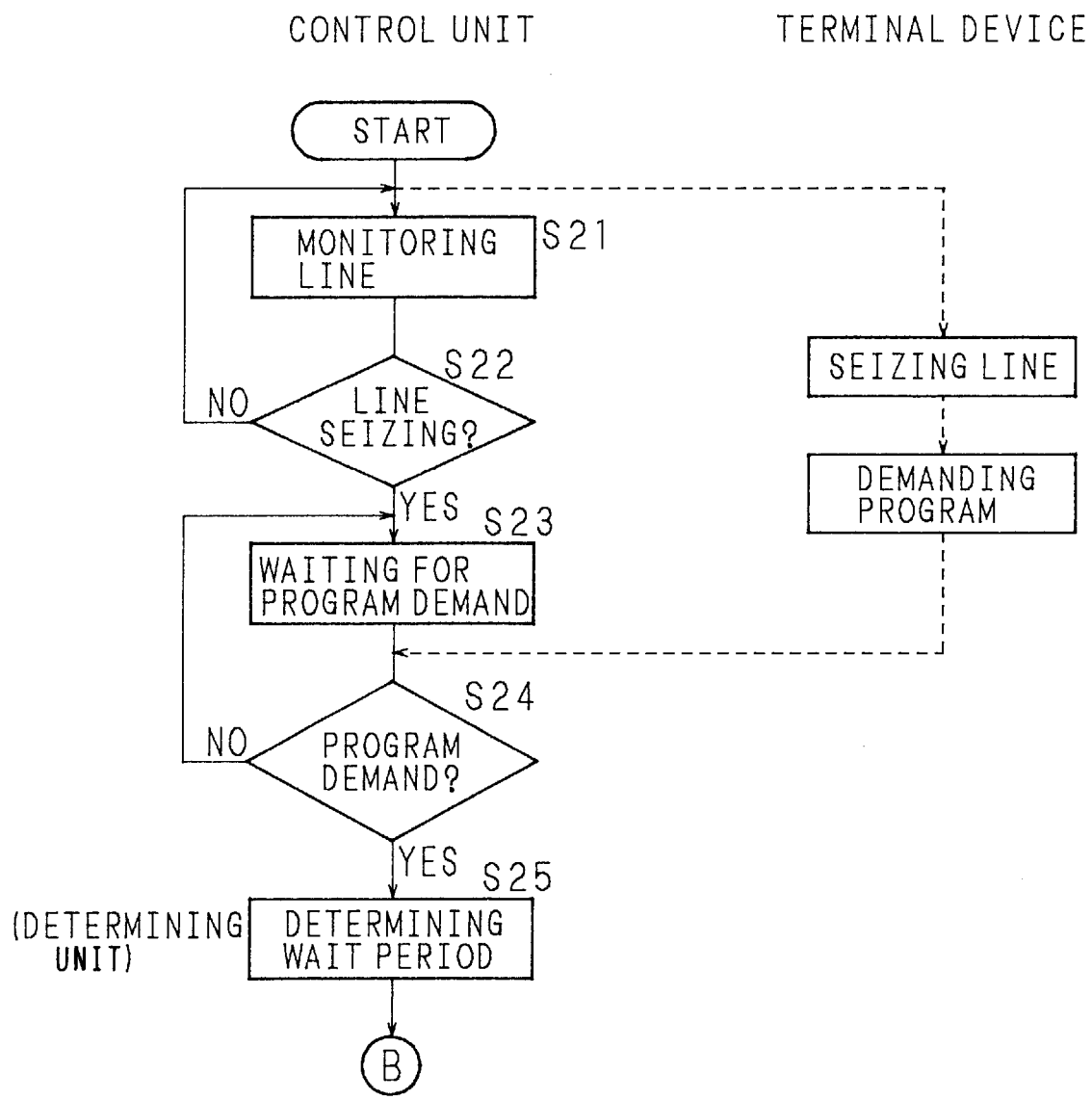
FIG. 21 is a flowchart showing the procedure of providing information in the information providing apparatus of the invention.
Figure 22:
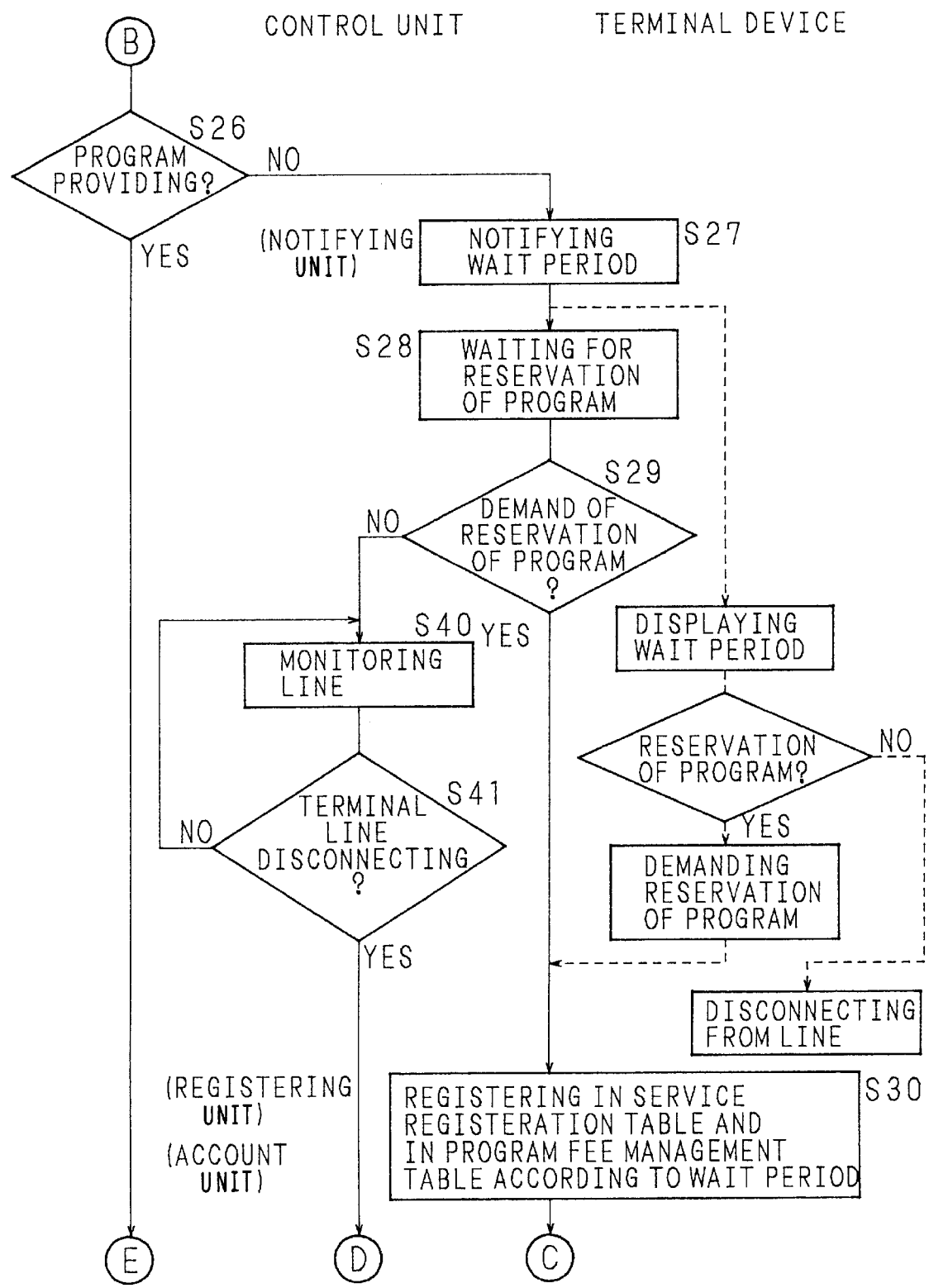
FIG. 22 is a flowchart showing the procedure of providing information in the information providing apparatus of the invention.
Figure 23:
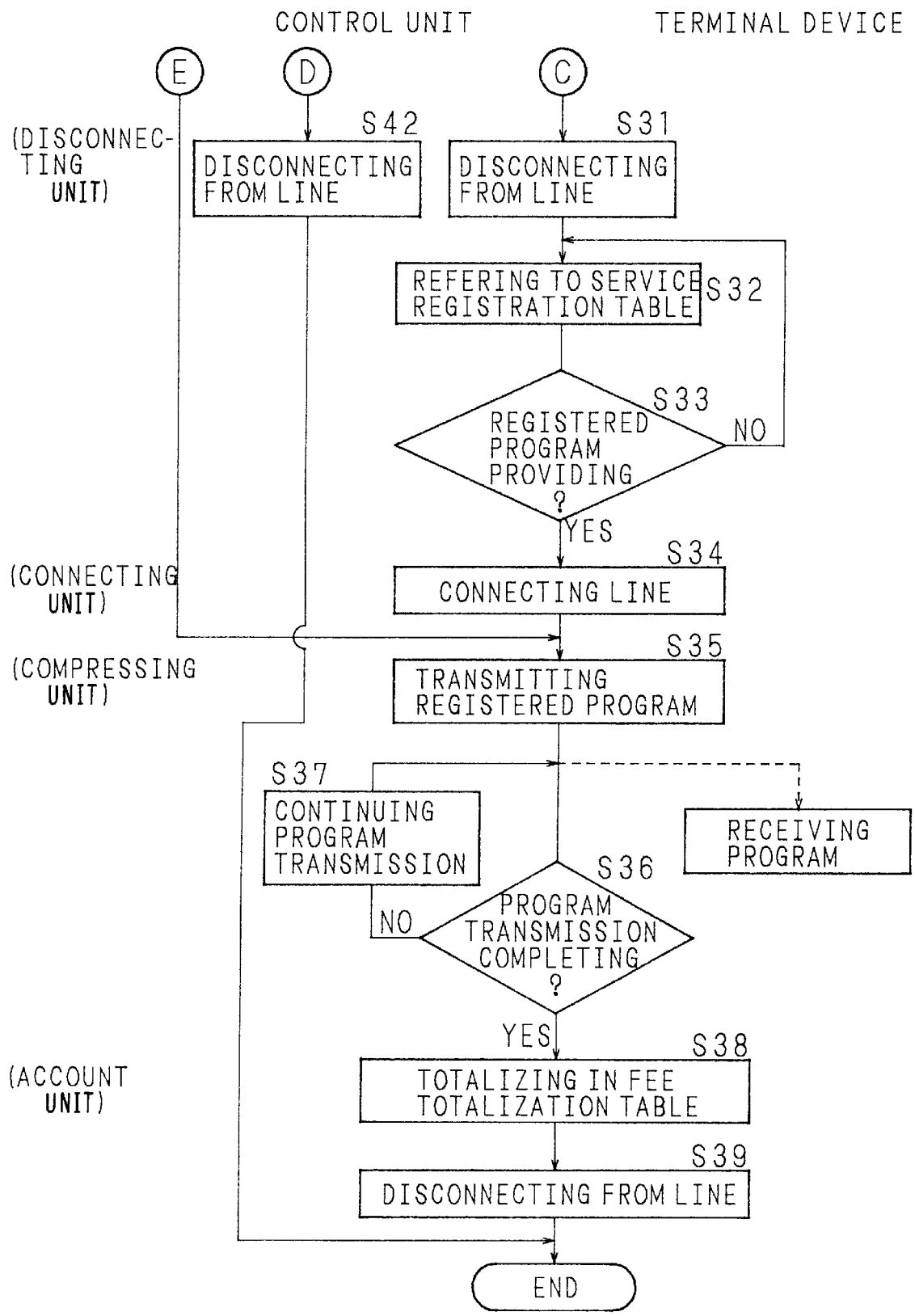
FIG. 23 is a flowchart showing the procedure of providing information in the information providing apparatus of the invention.

FIGS. 21, 22 and 23 are flowcharts showing the procedure of, in the case where the transmission lines in FIG. 10 are chargeable lines, providing a program by the control unit 5 when a user does not designate the compression method and designates only the name of the demanded program. In the flowcharts, the operations of the user conducted on the terminal device are also shown.

The control unit 5 always monitors the lines in order to provide a program to a user (step S21). The user seizes a line in order to demand a program, and then operates the keyboard of the terminal device to demand the program. The control unit 5 judges whether the user seizes a line or not (step S22). If NO, the process returns to step S21. If YES, the control unit 5 waits for a program demand (step S23). The control unit 5 judges whether the program demand exists or not (step S24). If No, the process returns to step S23. If YES, the control unit 5 checks whether the resources for providing the demanded program can be used or not. Furthermore, the control unit 5 refers to the program utilization state management table to determine the wait period (step S25), and judges whether the program can be provided or not, (step S26). When "occupied" is indicated the line in the utilization state column corresponding to the demanded program, the control unit 5 judges as NO, reads the value in the corresponding end time column, and then notifies the wait period to the user (step S27).

The wait period is displayed on the terminal device for the user considering the displayed wait period, the user decides whether the provision of the program is aborted or the provision of the program is received after an elapse of the wait period. In the former case, the terminal device is disconnected from the line, and, in the latter case, the user reserves the program.

After notifying the wait, period, the control unit 5 waits for the reservation of the program (step S28), and judges whether the reservation of the program is made or not (step S29). If YES, the contents of the reservation are registered in the service registration table, the contents of the reservation and the wait period are recorded in the fee management table according to the wait period (step S30), and the apparatus is disconnected from the line (step S31). Thereafter, the control unit 5 refers to the wait period column in the service registration table (step S32), and judges whether the registered program can be provided or not (step S33). If NO, the process returns to step S32. If YES, the control unit 5 calls the terminal device through which the reservation of the program was made, and connects the line to the device (step S34). Then, the registered program is sent out to the transmission line to be transmitted to the terminal device (step S35). The user receives the transmitted program.

The control unity 5 judges whether the program transmission is completed or not (step S36). If NO, the program transmission is continued (step S37), and the process returns to step S36. If YES, the contents recorded in the fee management table according to the wait period are totalized in the fee totalization table (step S38), and the apparatus is then disconnected from the line (step S39). If "available" is indicated in utilization state column corresponding to the demanded program in step S26, the control unit 5 judges as YES in step S26, and the process jumps to step S35. If NO in step S29, the control unit 5 monitors the line (step S40), and judges whether the user disconnects the terminal device from the line or not (step S41). If NO, the process returns to step S40, and, if YES, the apparatus is disconnected from the line (step S42).

As described above, the line is disconnected at the time when the program is registered, and connected at the time where the program is ready to be provided, whereby the line charge can be reduced.

Hereinafter, the invention will be further described with using a specific example in the case where the transmission lines are chargeable lines.

Figure 24:
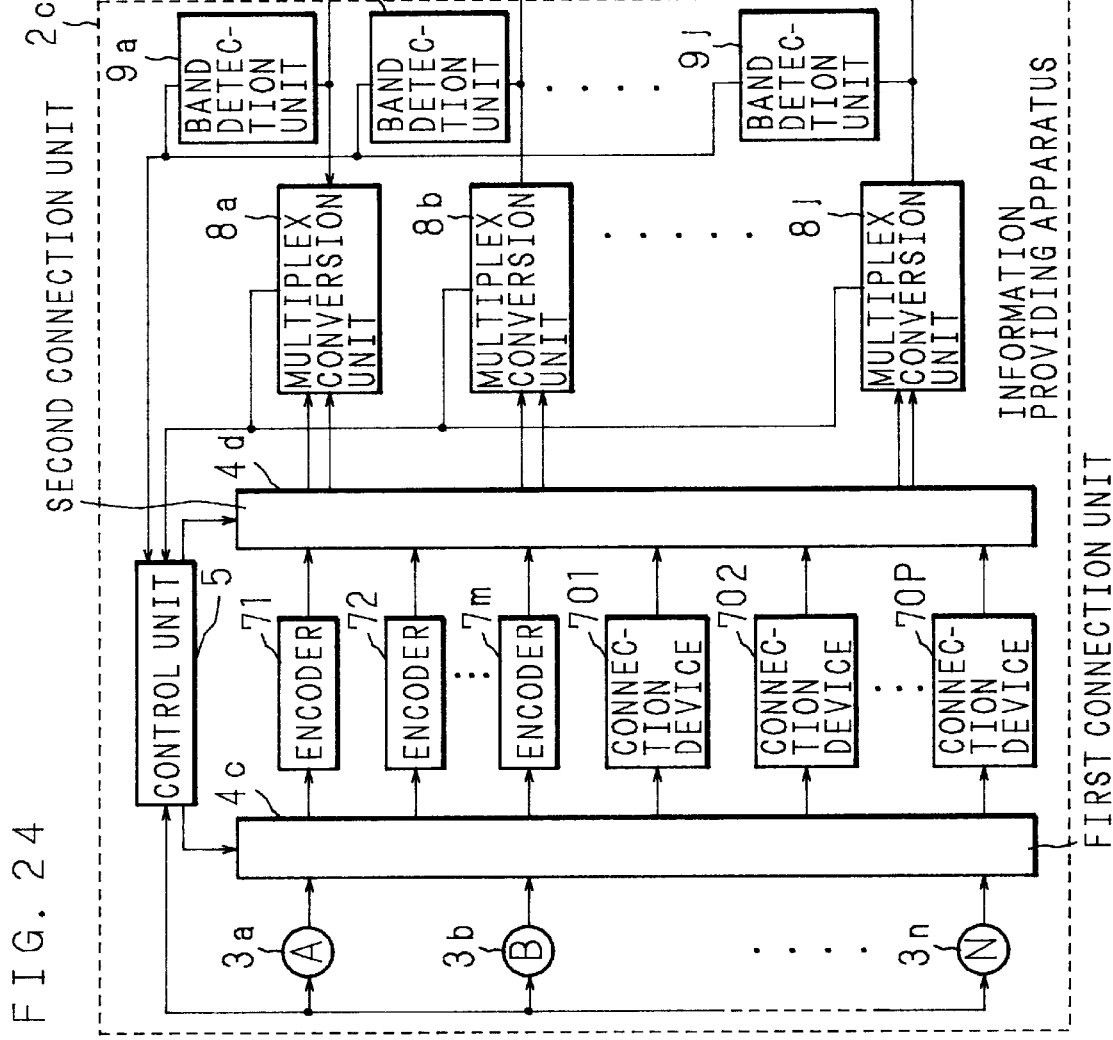
FIG. 24 is a block diagram showing an information providing apparatus of the invention and its periphery.
Figure 25:
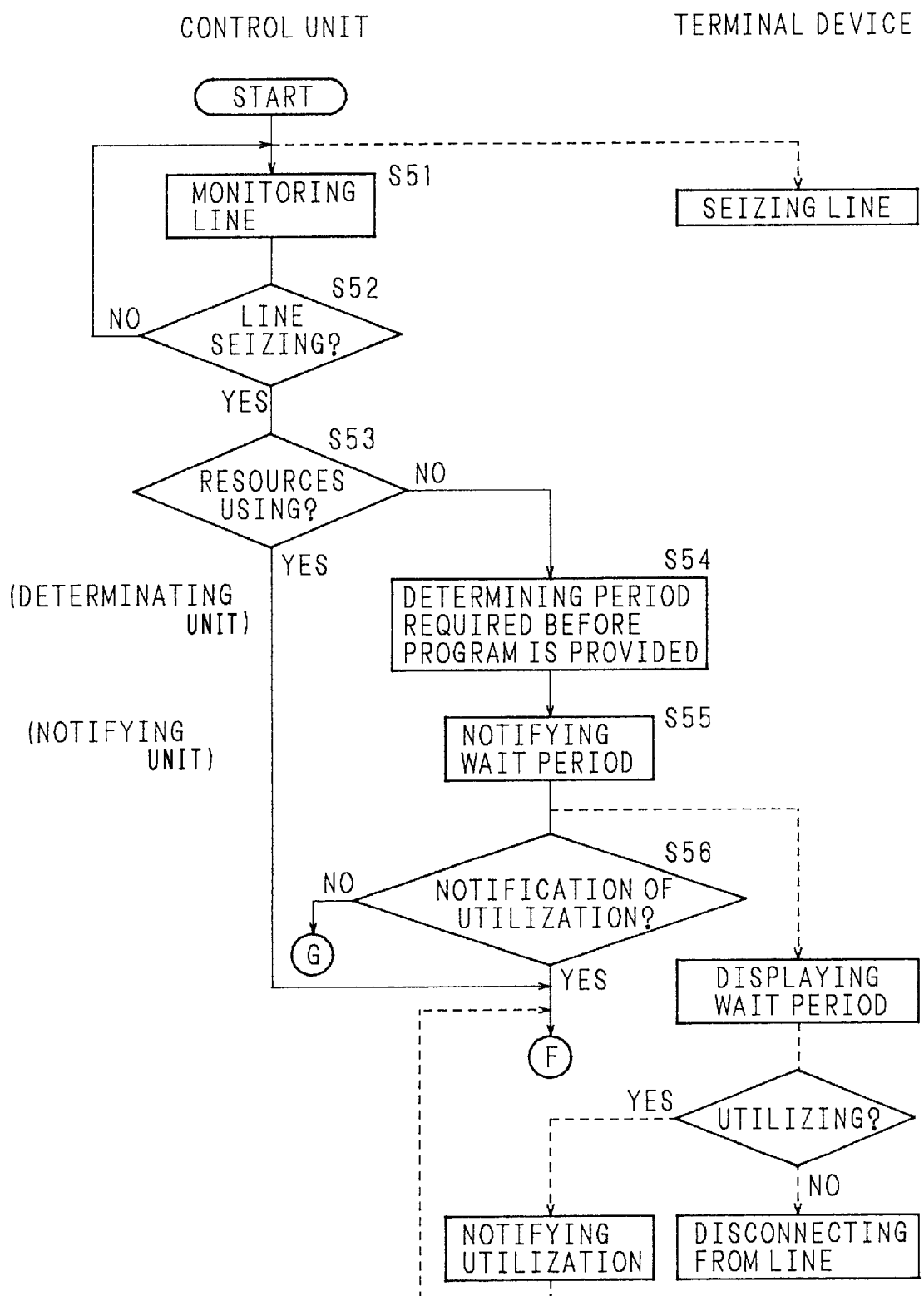
FIG. 25 is a flowchart showing the procedure of providing information in the information providing apparatus of the invention.
Figure 26:
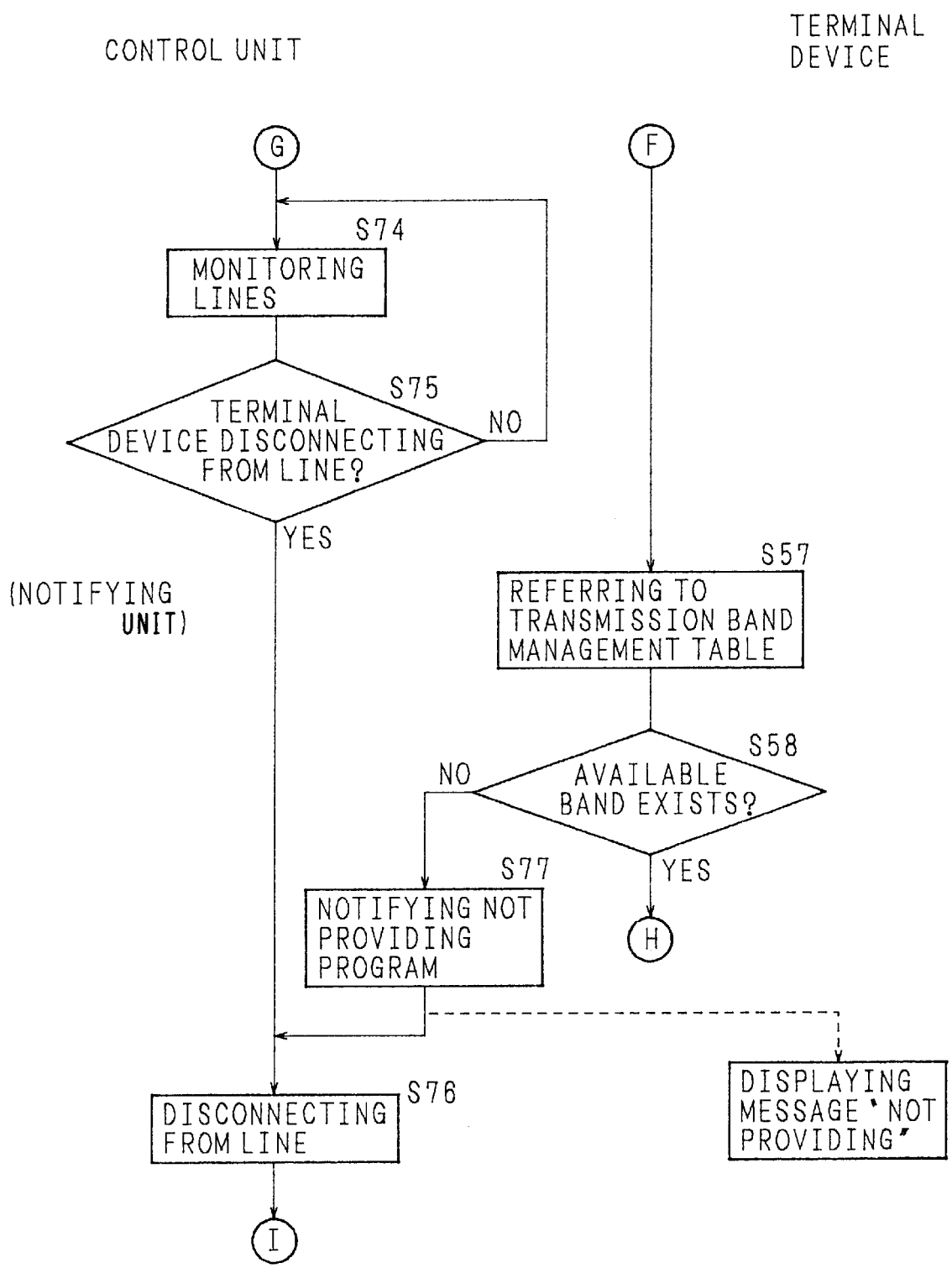
FIG. 26 is a flowchart showing the procedure of providing information in the information providing apparatus of the invention.
Figure 27:
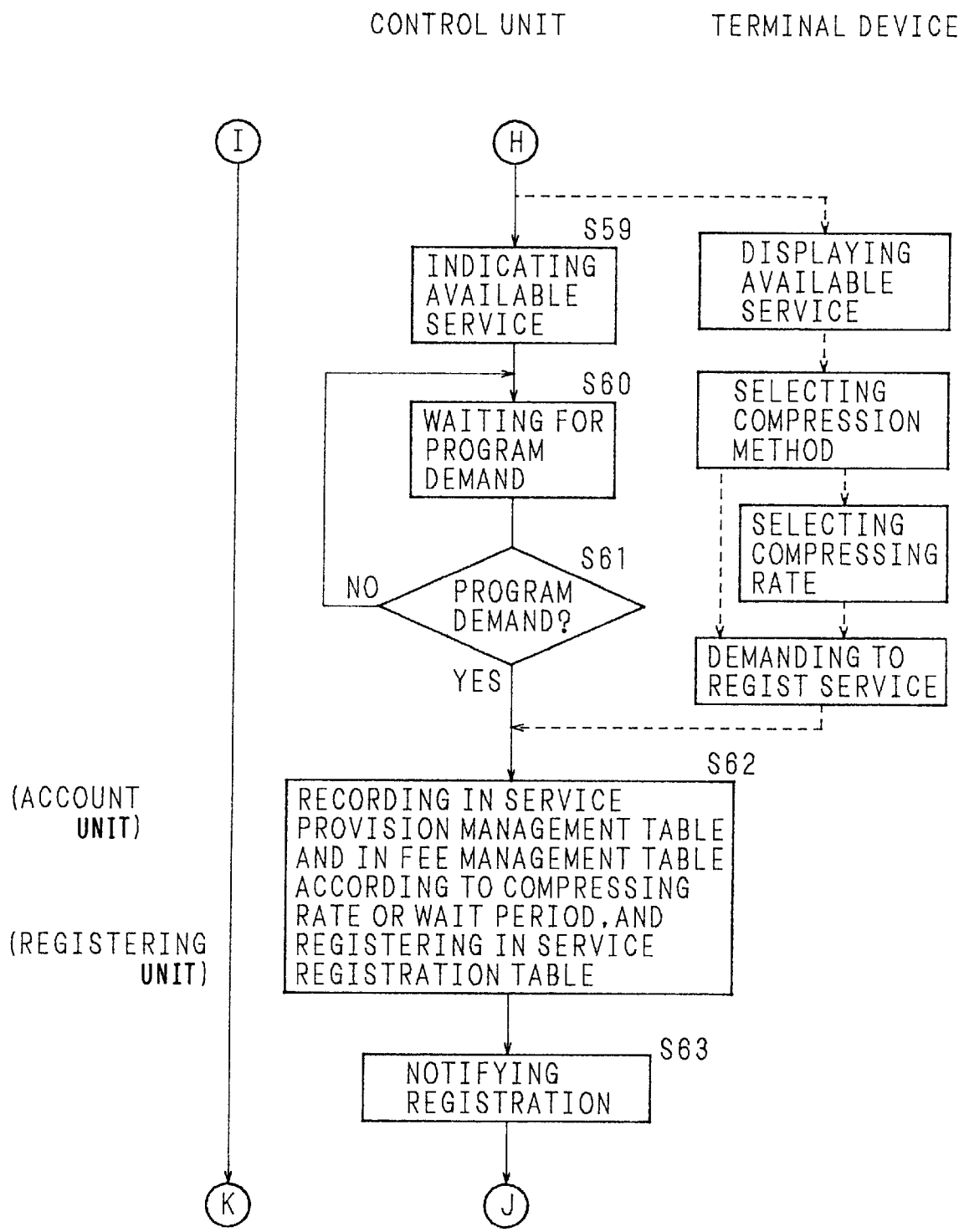
FIG. 27 is a flowchart showing the procedure of providing information in the information providing apparatus of the invention.
Figure 28:
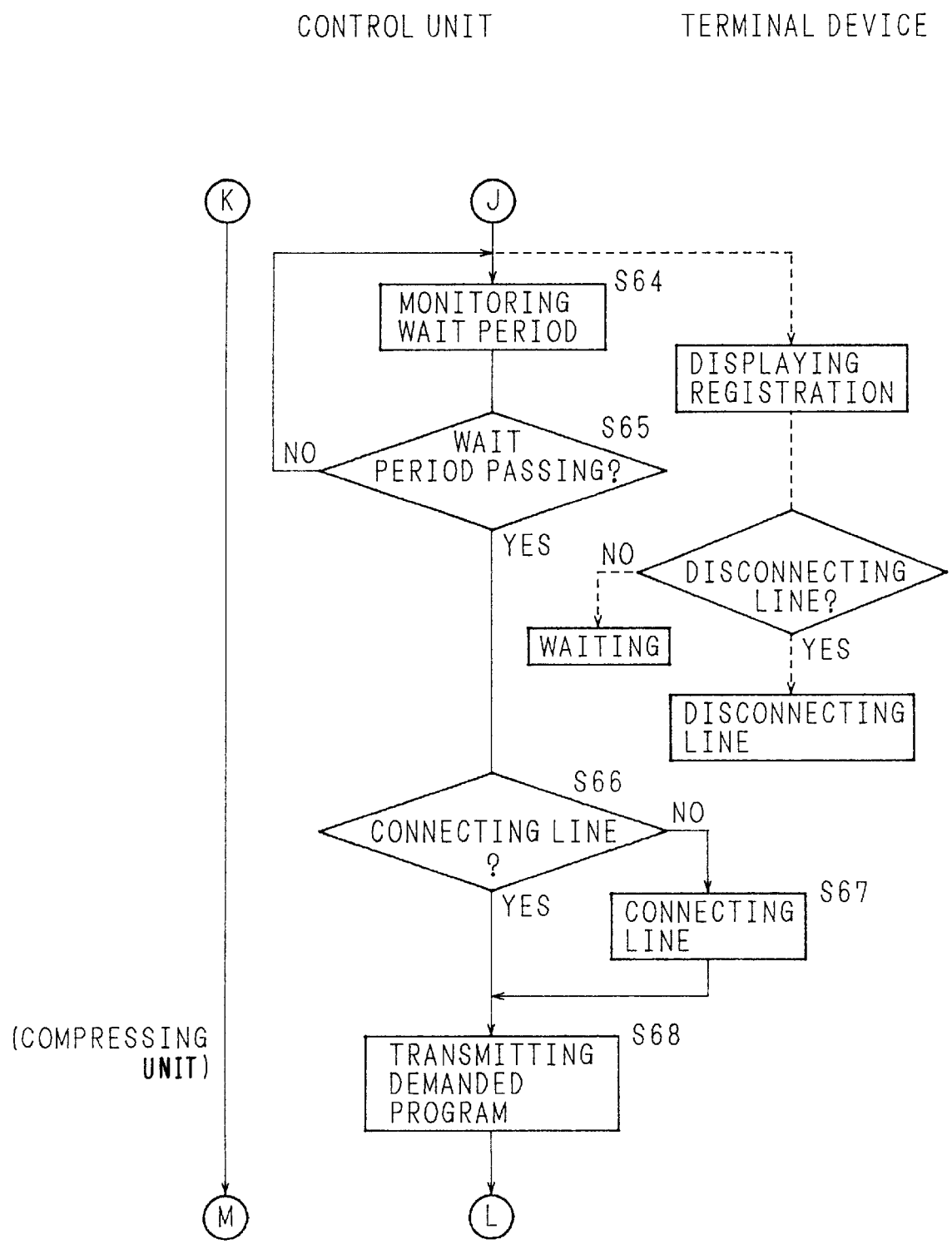
FIG. 28 is a flowchart showing the procedure of providing information in the information providing apparatus of the invention.
Figure 29:
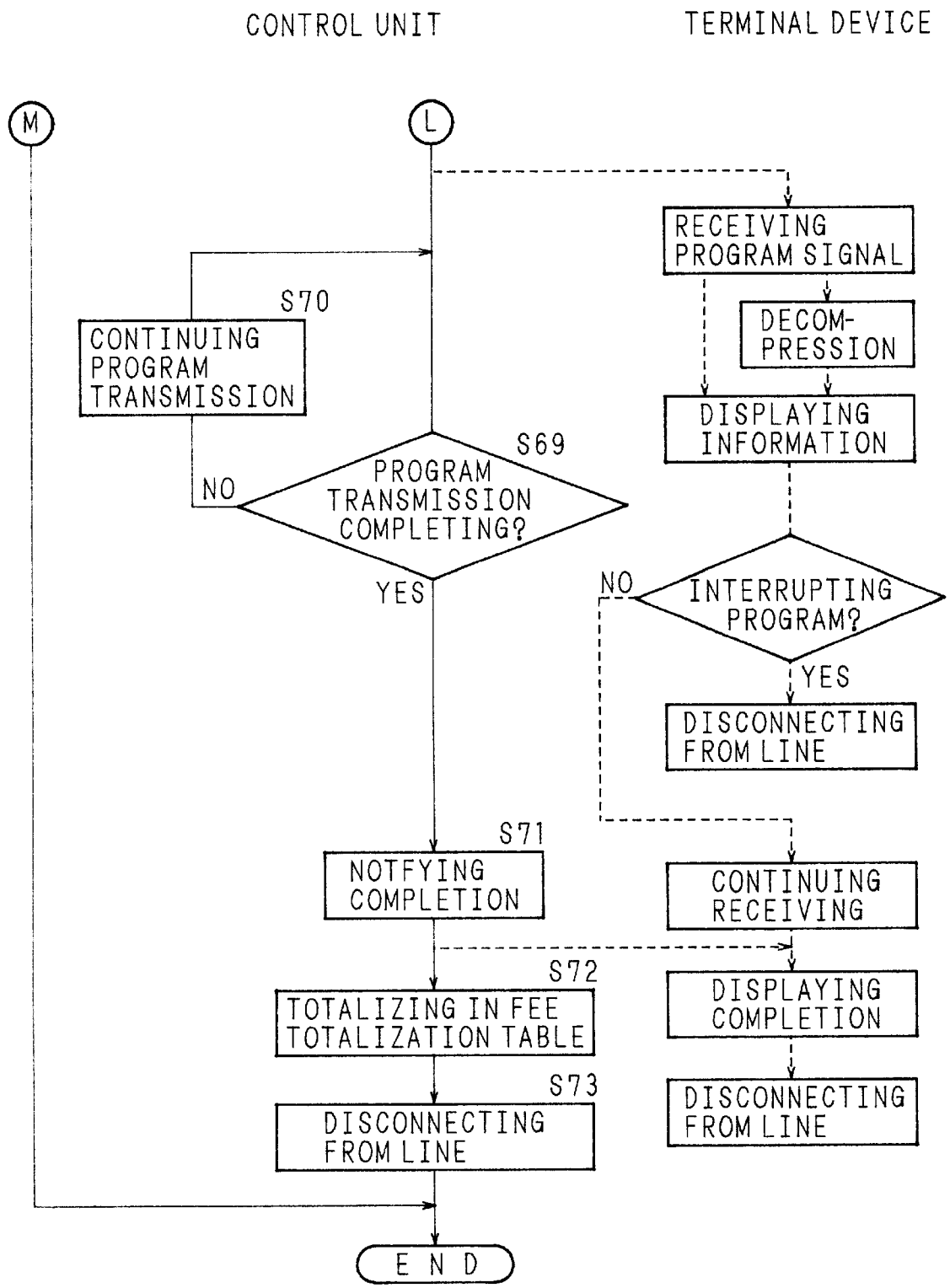
FIG. 29 is a flowchart showing the procedure of providing information in the information providing apparatus of the invention.

FIG. 24 is a block diagram showing an embodiment of the invention in which an information providing apparatus 2c is connected to terminal devices $1a_1$, and $1a_2$, $1b_1$ and $1b_2$ up to $1j_1$ and $1j_2$ for users I, II through X, via chargeable transmission lines 6a through 6j. In the figure, the input port of a first connection unit 4c is connected to reproduction units 3a, 3b through 3n, and the output port to encoders 71, 72 through 7m and connection devices 701, 702 through 70p. The devices in the input port and those at the output port are connected to each other in a one-to-one relationship under the control of the control unit 5. The input port of a second connection unit 4d is connected to the encoders 71, 72 through 7m and the connection devices 701, 702 through 70p, the output port to multiplex conversion units 8a, 8b through 8j via respective two connection lines. The devices in the input port and those at the output port are connected to each other in a one-to-one relationship under the control of the control unit 5. In order to provide one of programs A, B through N in accordance with a demand of the users I, II through X, the control unit 5 instructs the reproduction unit which stores the program designated by the user, to reproduce the program. When the user designates a compressing rate, the control unit 5 selects one of the encoders which conducts compression at the designated compressing rate, and, when the user does not designate a compressing rate, the control unit 5 selects either of the connection devices. Then, the reproduction unit which is instructed to conduct the reproduction, and the selected encoder or connection device are connected to each other in a one-to-one relationship via the first connection unit 4c. The selected encoder or connection device, and one connection line of the multiplex conversion unit corresponding to the user are connected to each other in a one-to-one relationship via the second connection unit 4d.

The chargeable transmission lines 6a through 6j allow information to be transmitted in a transmission band conforming to the plural terminal devices for the users I, II through X. The other configuration is the same as that of FIG. 5. The same components are designated by the same reference numerals, and their description is omitted.

When two connection units are disposed as described above, information of programs can be compressed or uncompressed in accordance with transmission bands of chargeable lines, so that the numbers of encoders and connection devices can be suppressed or prevented from being excess.

Next,, the information providing operation conducted by the information providing apparatus 2c will be described. FIGS. 25 to 29 are flowcharts showing a procedure conducted in the case where a user demands a service while not designating a program. In the procedure, the control unit 5 indicates to the user the programs which can be provided in accordance with the operation states of facilities for providing programs and the available bands of chargeable lines, and, immediately after this indication or after a wait period, the control unit 5 provides a program selected by the user. In the flowcharts, the operations of the user conducted on the terminal device are also shown.

The control unit, 5 always monitors the lines in order to provide a program to a user (step S51). The user seizes a line in order to inquire whether an appropriate program is available. The control unit 5 judges whether the user seizes a line or not (step S52). If NO, the process returns to step S51. If YES, the control unit 5 judges whether the resources for providing the program can be used or not (step S53). If the judgment is NO, the period which is too be required before the program is provided is determined (step S54), and the wait, period is notified to the user (step S55). The wait period is displayed on the terminal device for the user. Considering the displayed wait period, the user decides whether the program is to be utilized or not. In the case where the program is utilized, the user notifies it, and, in the case where the program is not utilized, the terminal device is disconnected from the line.

The control unit 5 judges whether there is the notification of utilization or not (step S56). If YES, the transmission band management table is referred to (step S57), an available band is detected by subtracting the occupied band from the transmission band of the line, so as to judge whether the available band exists or not from the subtraction result (step S58). If YES, an available service is selected in accordance with the available band, and the selected service is indicated to the user (step S59). The available service list is displayed on the terminal device for the user. The user selects a program and a compression method from the available service list, and also a compressing rate if necessary, and demands service registration. The control unit 5 waits for a registration demand (step S60), and judges whether a program demand is issued or not (step S61). If NO, the process returns to step S60. If YES, the contents of the program demand are recorded in the fee management table according to the compressing rate and in the service provision management table, and, when a wait period is required before the provision, the contents are recorded also in the fee management table according to the wait period and registered in the service registration table (step S62). Then, the user is notified that the registration has been done, and this information is displayed on the terminal device for the user (step S63).

When there is a wait period, the user determines whether the terminal device is disconnected from the line or not. If YES, the terminal device is disconnected from the line. If NO, the user can demand another program. When another program is not demanded, or when no wait period is required, the user waits without conducting any operation. In this case, the control unit 5 monitors the wait, period (step S64), and judges whether the wait period has passed or not. (step S65). If NO, the process returns to step S64. If YES and if no wait period is required, the control unit 5 judges whether the apparatus is connected to the line or not (step S66). If NO, the control unit 5 calls the terminal device through which the program was demanded, and connects the line to the device (step S67). If YES, the demanded program is transmitted. When another program is viewed or listened to during the wait period, the program is interrupted, and the demanded program is sent out, to the transmission line to be transmitted to the terminal device (step S68). The terminal device receives signals of the transmitted program. When the program is compressed, it is restored, and, when it is uncompressed, it is displayed on the display device as it is. The user may interrupt the program in the course of the reception. When the program is interrupted or is completed, the terminal device is disconnected from the line.

The control unit 5 judges whether the program transmission is completed or not (step S69). If NO, the program transmission is continued (step S70). If YES, the completion is notified to the user (step S71). The completion is displayed on the terminal device for the user, and the user disconnects the terminal device from the line. The control unit 5 totalizes the contents recorded in the fee management table according to the compressing rate or the wait period, in the fee totalization table (step S72), and the apparatus is then disconnected from the line (step S73).

If YES in step S53, the process jumps to step S57.

If NO in step S56, the control unit 5 monitors the line (step S74), and judges whether the user disconnects the terminal device from the line or not (step S75). If NO, the process returns to step S74, and, if YES, the apparatus is disconnected from the line (step S76).

If NO in step S58, it is notified that the program cannot be provided (step S77), and the process proceeds to step S76.

The terminal device for the user displays a message that the program cannot be provided.

In this way, when a wait period is required, another program can be viewed or listened to during the wait period.

As described above, according to the invention, information which is compressed or uncompressed can be provided with conforming to a transmission enabled band of a transmission line to which plural terminal devices are connected. Therefore, the transmission line can be effectively utilized, and the user can designate a compressing rate.

Furthermore, in accordance with the transmission lines of different transmission bands, the communication band to be used can be varied, and compressed or uncompressed information can be provided. Therefore, the apparatus can cope with a further increased number of users through various kinds of transmission lines, and the user can designate a compressing rate. Moreover, information about the utilization can be provided to the user in an interactive manner.

A fee of providing information can be decided in accordance with the compressing degree of information. Consequently, a service can be equitably provided.

Furthermore, the period which is to be required before information is provided can be determined.

When there is a period before information can be provided, the user can make a reservation, and the demanded information can be provided in accordance with the reservation. Consequently, the user is free from irritation due to a wait period. According to the aforementioned embodiment, during a wait period, the user can utilize another program.

Moreover, a fee of providing information can be decided in accordance with a period which is to be required before the information is provided, and accounts can be flexibly changed in accordance with a wait period.

Furthermore, the invention can attain excellent effects such as that the line charge for the wait period can be reduced because a terminal device can be disconnected from the line during a wait period before information is provided.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An information providing apparatus which provides, via a transmission line to which plural terminal devices are connected, information, said information providing apparatus comprising:

detecting means for detecting a band of said transmission line in which information can be transmitted;

plural compressing means for compressing information at different compressing rates;

selecting means for selecting among information which is compressed by said compressing means and information which is not compressed and which can be transmitted within the range of the band which is detected by said detecting means; and sending means for sending the information which is selected by said selecting means to said transmission lines, wherein the information providing apparatus provides the information in accordance with demands of the plural terminal devices.

2. An information providing apparatus which provides, via plural transmission lines to which plural terminal devices are connected, information, said transmission lines having different transmission bands, and said information providing apparatus comprising:

plural compressing means having different compressing rates, respectively, for compressing information at one of the different compressing rates in accordance with the different transmission bands of said transmission lines in which the information is to be transmitted; and sending means for sending the information selected among information compressed by said compressing means and information which is not compressed, to the transmission line, wherein the information providing apparatus provides the information in accordance with demands of the plural terminal devices.

3. An information providing apparatus which provides, via a transmission line to which plural terminal devices are connected, information in accordance with demands of said plural terminal devices, comprising:

detecting means for detecting a band of said transmission line in which information can be transmitted;

plural compressing means for compressing information at different compressing rates;

selecting means for selecting among information which is compressed by said compressing means and information which is not compressed information which can be transmitted within the range of the band which is detected by said detecting means; sending means for sending out the information which is selected by said selecting means, to said transmission line; and account means for deciding a fee for providing the information, in accordance with said plural compressing means.

4. An information providing apparatus according to claim 3, further comprising determining means for determining a period which is to be required before demanded information is provided.

5. An information providing apparatus according to claim 4, wherein said account means decides a fee for providing the information, in accordance with the period determined by said determining means.

6. An information providing apparatus which provides, via plural transmission lines to which plural terminal devices are connected, information in accordance with demands of said plural terminal devices, said transmission lines having different transmission bands, comprising:

plural compressing means having different compressing rates, respectively, for compressing information at one of the different compressing rates in accordance with the transmission bands of said transmission lines in which the information is to be transmitted;

sending means for sending information selected among information is compressed by said compressing means and information which is not compressed, to the transmission line; and account means for deciding a fee for providing the information, in accordance with said plural compressing means.

7. An information providing apparatus according to claim 6, further comprising determining means for determining a period which is to be required before demanded information is provided.

8. An information providing apparatus according to claim 7, wherein said account means decides a fee for providing the information, in accordance with the period determined by said determining means.

9. An information providing apparatus which provides, via a transmission line to which plural terminal devices are connected, information in accordance with demands of said plural terminal devices, comprising:

detecting means for detecting a band of said transmission line in which information can be transmitted;

plural compressing means for compressing information at different compressing rates;

selecting means for selecting among information which is compressed by said compressing means and information which is not compressed information which can be transmitted within the range of the band which is detected by said detecting means;

sending means for sending out the information which is selected by said selecting means, to said transmission line; and determining means for determining a period which is to be required before demanded information is provided.

10. An information providing apparatus according to claim 9, further comprising:

notifying means for notifying the period determined by said determining means to the terminal device; and registering means for registering the information to provide, wherein, when the notified period has passed, said sending means sends out the information registered in said registering means to the transmission line.

11. An information providing apparatus according to claim 10, further comprising account means for deciding a fee for providing the information, in accordance with the period determined by said determining means.

12. An information providing apparatus according to claim 9, further comprising account means for deciding a fee for providing the information, in accordance with the period determined by said determining means.

13. An information providing apparatus which provides, via plural transmission lines to which plural terminal devices are connected, information in accordance with demands of said plural terminal devices, said transmission lines having different transmission bands, comprising:

plural compressing means having different compressing rates, respectively, for compressing information at one of the different compressing rates in accordance with the transmission bands of said transmission lines in which the information is to be transmitted;

sending means for sending information selected among information is compressed by said compressing means and information which is not compressed, to the transmission line; and determining means for determining a period which is to be required before demanded information is provided.

14. An information providing apparatus according to claim 13, further comprising:

notifying means for notifying the period determined by said determining means to the terminal device; and registering means for registering the information to provide, wherein, when the notified period has passed, said sending means sends out the information registered in said registering means to the transmission line.

15. An information providing apparatus according to claim 14, further comprising account means for deciding a fee for providing the information, in accordance with the period determined by said determining means.

16. An information providing apparatus according to claim 13, further comprising account means for deciding a fee for providing the information, in accordance with the period determined by said determining means.

17. An information providing apparatus which provides, via a transmission line to which a plurality of terminal devices are connected, information in accordance with requests of said plurality of terminal devices, said transmission line requiring a fee, comprising:

determining means for determining a period of time required to elapse before said information requested by said plurality of terminal devices is provided to said plurality of terminal devices;

notifying means for notifying the period of time required to elapse determined by said determining means to the plurality of terminal devices;

registering means for registering the information to be provided to said plurality of terminal devices;

disconnecting means for disconnecting said information providing apparatus from said transmission line after said registering means registers the information; and connecting means for connecting said information providing apparatus to said transmission line which has been disconnected by said disconnecting means after said period of time notified by said notifying means has elapsed.

18. A method of providing information via a transmission line to which a plurality of terminal devices are connected, comprising the steps of:

receiving a request for information and an optional user designated compression rate from said plurality of terminal devices;

detecting a band of said transmission line in which said requested information can be transmitted;

compressing said information requested at different compressing rates based on the requested optional compression rate received and the band detected;

selecting among information requests for compressed information and information which is not compressed which can be transmitted within a range of the band which has been detected; and sending the requested information which has been selected via said transmission line to said plurality of terminal devices.

19. A method of providing information via a plurality of transmission lines with different transmission bands to which a plurality of terminal devices are connected, comprising the steps of:

receiving requests for information and an optional user designated compression rate from said plurality of terminal devices via said plurality of transmission lines;

compressing said information requested at different compressing rates in accordance with said different transmission bands of said transmission lines and said optional user designated compression rate;

selecting among information requests for compressed information and information which is not compressed which can be transmitted within a range of said different transmission bands of said transmission lines; and sending said selected compressed information and information not compressed to said plurality of terminal devices via said transmission lines in accordance with said requests of said terminal devices.

* * * * *